United States Patent
Yeung et al.

(10) Patent No.: US 11,724,242 B2
(45) Date of Patent: Aug. 15, 2023

(54) FREESTANDING METAL-ORGANIC FRAMEWORK (MOF) AEROGELS AND PREPARATION

(71) Applicant: THE HONG KONG UNIVERSITY OF SCIENCE AND TECHNOLOGY, Hong Kong (CN)

(72) Inventors: King Lun Yeung, Hong Kong (CN); Zhang Liu, Hong Kong (CN)

(73) Assignee: THE HONG KONG UNIVERSITY OF SCIENCE AND TECHNOLOGY, Hong Kong (HK)

(*) Notice: Subject to any disclaimer, the term of this patent is extended or adjusted under 35 U.S.C. 154(b) by 802 days.

(21) Appl. No.: 16/728,304

(22) Filed: Dec. 27, 2019

(65) Prior Publication Data

US 2020/0206710 A1    Jul. 2, 2020

Related U.S. Application Data

(60) Provisional application No. 62/917,736, filed on Dec. 28, 2018.

(51) Int. Cl.
*B01J 13/00* (2006.01)
*F26B 5/06* (2006.01)
*C07F 3/06* (2006.01)

(52) U.S. Cl.
CPC ............ *B01J 13/0091* (2013.01); *C07F 3/06* (2013.01); *F26B 5/06* (2013.01)

(58) Field of Classification Search
CPC .......... B01J 13/0091; C07F 3/06; C07F 3/003; F26B 5/06
See application file for complete search history.

(56) References Cited

U.S. PATENT DOCUMENTS

2019/0111410 A1*   4/2019   Vallejo Sánchez .................. B01J 20/28042

OTHER PUBLICATIONS

Zhu et al ("Shapeable Fibrous Aerogels of Metal-Organic-Frameworks Templated with Nanocellulose for Rapid and Large-Capacity Adsorption", ACS Nano, May 9, 2018) (Year: 2018).*
Yan et al ("Size Controllable and Surface Tunable Zeolitic Imidazolate Framework-8-Poly(acrylic acid sodium salt) Nanocomposites for pH Responsive Drug Release and Enhanced in Vivo Cancer Treatment", ACS Appl. Mater. Interfaces 2017, 9). (Year: 2017).*

* cited by examiner

*Primary Examiner* — Robert S Jones, Jr.
*Assistant Examiner* — Jiangtian Xu
(74) *Attorney, Agent, or Firm* — Nath, Goldberg & Meyer; Jerald L. Meyer; Stanley N. Protigal

(57) ABSTRACT

An aerogel is formed by preparing metal-organic framework (MOF) aerogels by preparing a porous solid comprising a metal precursor for the metal-organic framework (MOF) aerogels, and transforming the metal precursor into the MOF by reacting the porous solid with organic ligands mixed with a solvent. The solvent is then removed by supercritical extraction and drying.

18 Claims, 18 Drawing Sheets
(15 of 18 Drawing Sheet(s) Filed in Color)

ZIF-7

ZIF-90

MOF-74 (Zn)

IRMOF-3

MIL-53 (Al)

NH$_2$ MIL-53 (Al)

MOF-74 (Ni)

MIL-100 (Fe)

FREESTANDING METAL-ORGANIC FRAMEWORK (MOF) AEROGELS AND PREPARATION

RELATED APPLICATION

The present Patent Application claims priority to Provisional Patent Application No. 62/917,736, filed 28 Dec. 2018, which is assigned to the assignee hereof and filed by the inventors hereof and which is incorporated by reference herein.

BACKGROUND

Technical Field

The present disclosure relates to a gel network and to the fabrication of the gel network. More particularly, the disclosure relates to the formation of an aerogel, using a sol-gel process, and describes methods for the preparation of MOF aerogels.

Background Art

Metal-organic frameworks (MOFs) consist of metal ions or clusters that are coordinated to organic ligands to form one-, two-, or three-dimensional structures with a well-defined pore network for molecular transport, separation and storage. The skeletal network can facilitate and catalyze molecular reaction and transformation. Potential applications include, by way of non-limiting examples, gas separation and storage, $CO_2$ capture, water purification, catalysis of reaction and pollution remediation.

The possible assembly of MOFs into highly porous materials such as aerogel and cryogel materials can give the material interesting mechanical, thermal and optical properties. Aerogels of silica, inorganic oxides and mixed oxides are often prepared by a standard sol-gel technique followed by supercritical extraction and drying to remove the solvent. Carbon, graphene and polymer-derived material (e.g., polymeric resorcinol-formaldehyde (RF) and melamine-formaldehyde (MF)) often involve polymerization reaction or use of linkers for assembly followed by the removal of the dispersed solvent phase from the gel.

Aerogels have a variety of applications. Foremost are their uses as thermal insulation. Aerogels are used in sensors, optical devices, waveguides, electronics and lasers. Other uses for aerogels are in nuclear particle detection and in waste management such as pollutant absorption, and vitrification of nuclear waste. Aerogels are also used as catalysts, energy storage devices and electrical capacitors.

SUMMARY

An aerogel is formed by preparing metal organic framework (MOF) aerogels by preparing a porous solid comprising a metal precursor for the MOF aerogels, and transforming the metal precursor into the MOF by reacting the porous solid with organic ligands mixed with a solvent. The solvent is then removed by supercritical extraction and drying.

BRIEF DESCRIPTION OF THE DRAWINGS

The file of this patent contains at least one drawing executed in color. Copies of this patent with color drawings will be provided by the Office upon request and payment of the necessary fee.

(FIG. 2B) its corresponding aerogel following supercritical drying.

(FIG. 3B) ZIF-8; and (FIG. 3C) MOF-5 following supercritical drying of corresponding MOF wet-gels.

(FIG. 5B) ZIF-8; and (FIG. 5C) MOF-5 aerogels prepared from the zinc precursor wet-gel according to the procedure describe in this disclosure. The insets in the SEM images are pictures of the aerogel blocks of the corresponding samples.

FIG. 6A shows a Zn-based aerogel. FIGS. 6B-6I are 3D reconstruction images of the aerogel.

FIG. 7A shows a ZIF-8-based aerogel. FIGS. 7B-7H are 3D reconstruction images of the aerogel.

FIG. 8A shows a MOF-5-based aerogel.

(FIG. 9B) calculated pore size distribution for the zinc precursor aerogel from supercritical drying of zinc precursor wet-gel and the ZIF-8 and MOF-5 aerogels prepared from the zinc precursor wet-gel.

(FIG. 12B) a ZIF-8 aerogel placed on the heating plate.

(FIG. 13B) ZIF-8 xerogel; and (FIG. 13C) ZIF-8 powder before and after heat treatment.

(FIG. 14B) ZIF-8 xerogel; and (FIG. 14C) ZIF-8 aerogel with exposure to boiling water. FIG. 14D shows plots of the change in the intensity ratio of a characteristic diffraction peak.

FIGS. 16A-16C are SEM images of ZIF-8 aerogels following transformation at different temperatures. FIGS. 16D-16F are SEM images of MOF-5 aerogels following transformation at different temperatures. The insets show corresponding individual ZIF-8 crystallites.

FIG. 18A shows the zinc precursor gel. FIGS. 18B-18E are photographic images of (FIG. 18B) the prepared ZIF-7; (FIG. 18C) ZIF-90; (FIG. 18D) MOF-74; and (FIG. 18E) IRMOF-3 aerogels.

FIG. 19A shows the aluminum precursor gel. FIGS. 19B and 19C show the prepared MIL-53 and $NH_2$-MIL-53 aerogels from its transformation.

(FIG. 20B) iron precursor gels and (FIGS. 20A and 20B) the respective MOF-74 and MIL-100 aerogels from transformation.

DETAILED DESCRIPTION

Overview

The disclosed technology pertains to the preparation of MOF aerogels 1 involves:
- preparation of a gel containing the metal precursor, and transformation of the metal precursor in the gel network into MOF, followed by
- removal of the solvent by supercritical extraction and drying.

The metal precursor is assembled into a gel network via a sol-gel process involving gelation agents such as propylene oxide, urea and citrate. Polymers including but not limited to polyacrylic acid can be used as a scaffold to strengthen the gel network during the gelation process. Metal precursor gels of zinc, aluminum, nickel and iron can be prepared using propylene oxide as gelation agent. The method can be used to prepare gels containing two or more metal precursors. In addition to zinc, aluminum, nickel and iron, gels of different metals can be prepared using other gelation agents by one skilled in the art.

The resulting wet gel containing the metal precursor can be reacted with specific organic ligands to prepare the desired MOF materials. The organic ligands are introduced into the wet gel and allowed to react and transform the gel network into MOFs. Temperature and pressure can be used to accelerate and control the transformation of the precursor gel into MOF wet gel. Mixtures of organic ligands can be used to prepare mixed MOFs from the gel. The removal of the dispersed solvent phase by sublimation under lyophilisation or supercritical conditions produces lightweight materials of high porosity. The aerogels produced in all these examples exhibit minimal shrinkage before and after supercritical drying. Crosslinking of the gel networks provides reasonable mechanical strength, and mesoporous structure with very large specific surface areas and large mesopore volumes. Typical solid contents range from 0.03 to 0.5 g/cm$^3$, and alternatively between 0.15 and 0.25 g/cm$^3$. The MOF conversion is 75 to 99%.

Process

Figure 1:
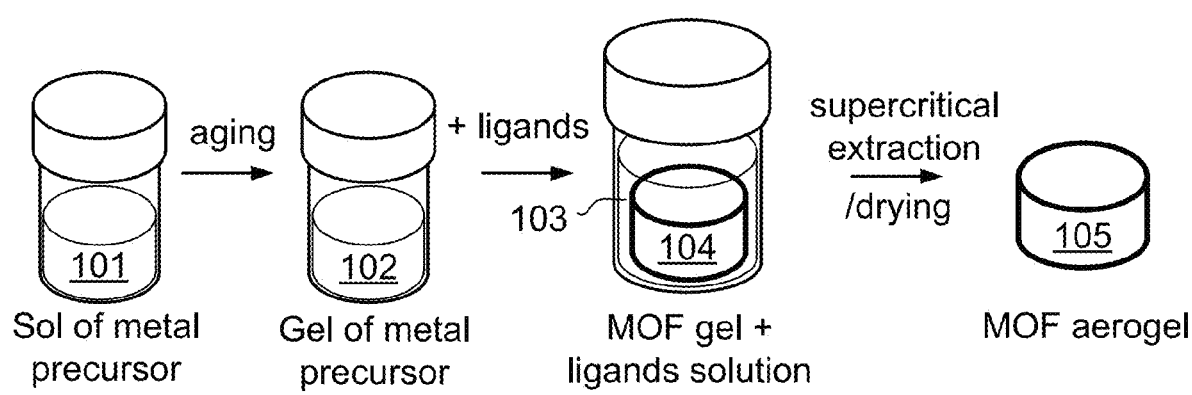
FIG. 1 is a schematic diagram showing a preparation procedure for a metal-organic framework (MOF) aerogel that starts with the preparation of metal precursor sol and their gelation, followed by their transformation with the addition of select complexing ligands into metal-organic frameworks, and removal of the unreacted ligands to produce a metal-organic framework aerogel.

FIG. 1 is a schematic diagram showing a preparation procedure for metal-organic framework (MOF) aerogel that starts with the preparation of metal precursor sol and their gelation, followed by their transformation with the addition of select complexing ligands into metal-organic framework and removal of the solvents to produce a metal-organic framework aerogel.

The preparation starts with the preparation of metal precursor sol 101, followed by an aging process, which results in formation of a gel of the metal precursor 102. Complexing ligands are added into the metal-organic framework to render ligands solutions 103 and form a metal-organic framework (MOF) gel 104. This is followed by removal of the unreacted ligands by washing steps and the removal of the solvents by a supercritical drying to produce a metal-organic framework aerogel 105.

Figure 2A:
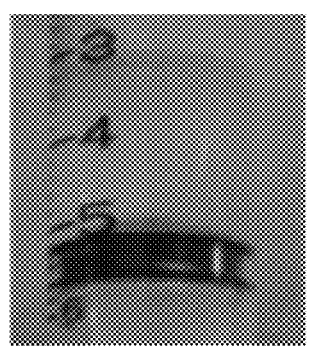
FIGS. 2A and 2B are photographic images of (FIG. 2A) zinc precursor sol after gelation.
Figure 2B:
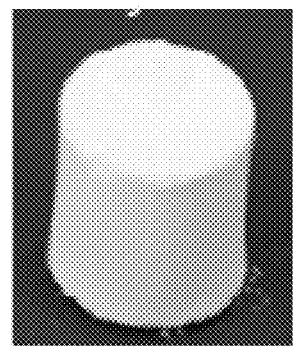

FIGS. 2A and 2B are photographic images of (FIG. 2A) zinc precursor sol after gelation; and (FIG. 2B) its corresponding aerogel following supercritical drying. A zinc precursor gel was prepared via sol-gel process using propylene oxide as gelation agent. Referring to FIG. 2B, a freestanding, crack-free zinc precursor aerogel was obtained after supercritical extraction and drying. This confirms that a gel network was formed during the gelation process.

The above description of preparing the zinc precursor gel via sol-gel process using propylene oxide as gelation agent presents an example of the using a plurality of precursors, and thereby forming the gel network from a corresponding plurality of metals. The technique uses a metal precursor gel or a polymer to strengthen the gel network.

Figure 3A:
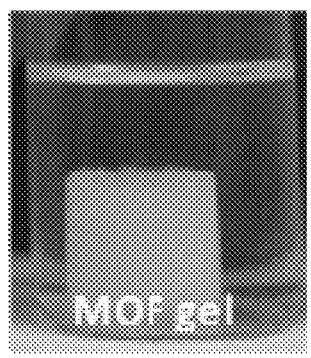
FIGS. 3A, 3B and 3C are photographic images of (FIG. 3A) metal-organic framework (MOF) wet-gel and aerogels.
Figure 3B:
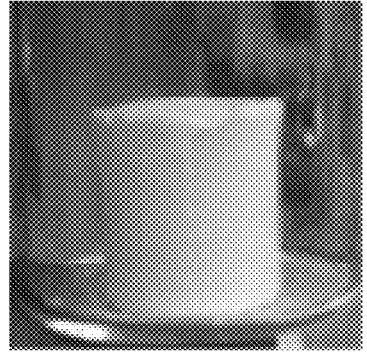
Figure 3C:
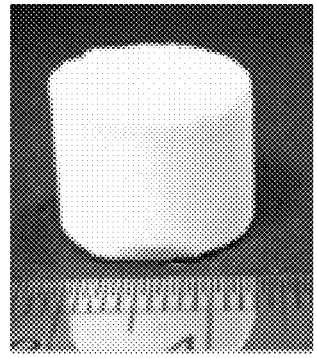

FIGS. 3A, 3B and 3C are photographic images of (FIG. 3A) metal-organic framework (MOF) wet-gel and aerogels; (FIG. 3B) ZIF-8; and (FIG. 3C) MOF-5 following supercritical drying of corresponding MOF wet-gels.

In FIG. 3A, the zinc precursor gel following reaction with organic ligands forms a MOF wet gel. ZIF-8 wet gel was obtained after reaction with 0.2 to 0.5 M 2-methylimidazole ligand in alcohol, whereas MOF-5 was obtained with 0.05 to 1 M terephthalate ligand in solvent. Non-limiting examples of suitable solvents are dimethylformamide (DMF), tetrahydrofuran (THF) and THF/$H_2O$. ZIF-8, as shown in FIG. 3B. Referring to FIG. 3C, MOF-5 freestanding aerogels were obtained after supercritical extraction and drying.

Figure 4:
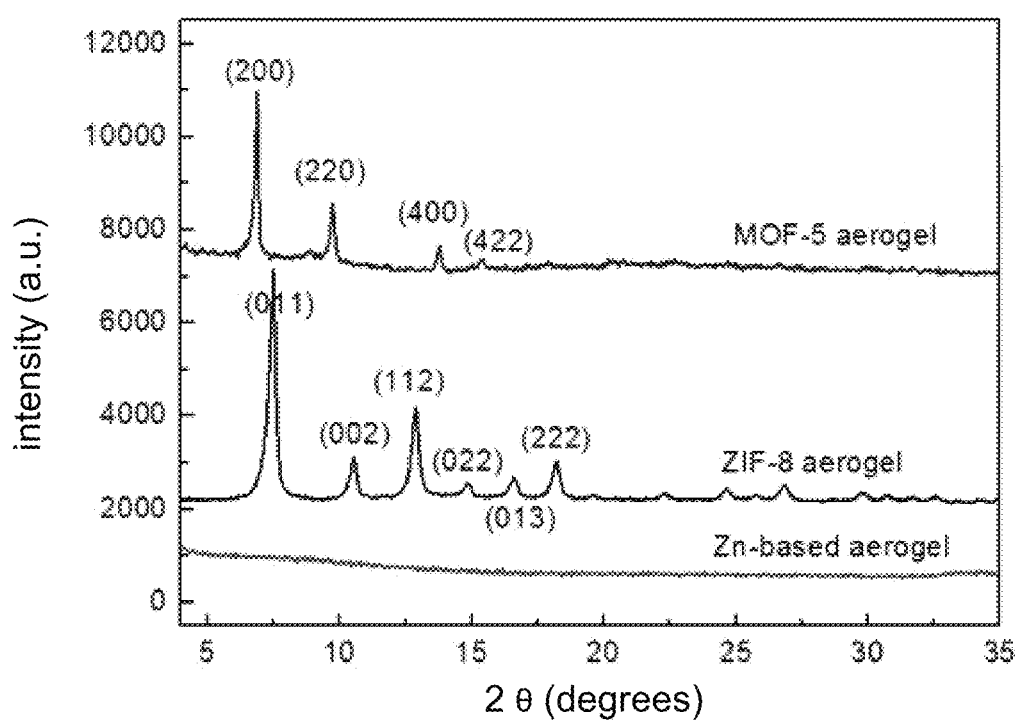
FIG. 4 is a graphic depiction of X-ray diffraction patterns of zinc precursor aerogel obtained by supercritical drying of the zinc precursor wet-gel, and the ZIF-8 and MOF-5 aerogels prepared from the zinc precursor wet-gel.

FIG. 4 is a graphic depiction of X-ray diffraction patterns of zinc precursor aerogel obtained by supercritical drying of the zinc precursor wet-gel, and the ZIF-8 and MOF-5 aerogels prepared from the zinc precursor wet-gel. X-ray diffraction confirms the successful transformation of the zinc in the precursor gel into ZIF-8 and MOF-5.

Figure 5A:
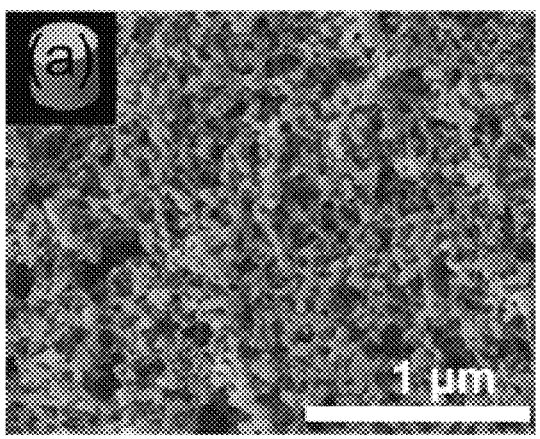
FIGS. 5A-5C are scanning electron microscopy (SEM) images of (FIG. 5A) zinc precursor aerogel from supercritical drying of zinc precursor wet-gel.
Figure 5B:
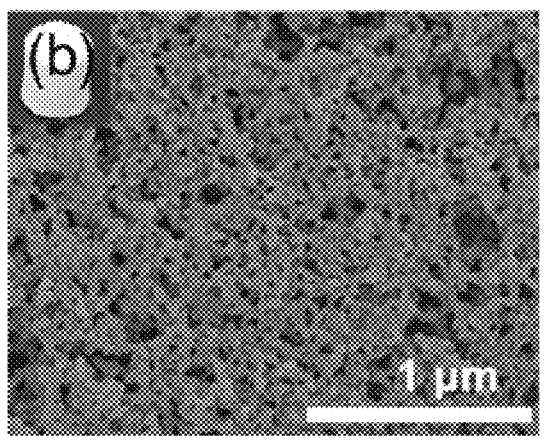
Figure 5C:
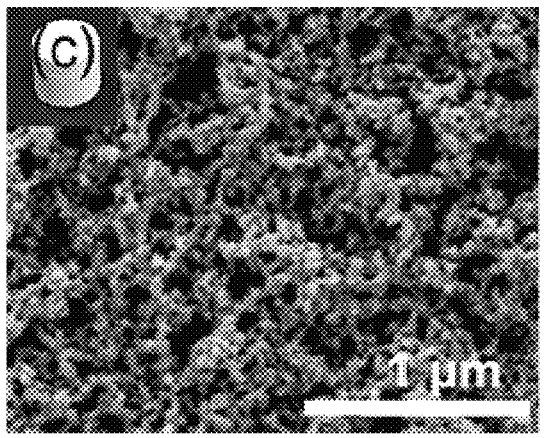

FIGS. 5A-5C are scanning electron microscopy (SEM) images of (FIG. 5A) zinc precursor aerogel from supercritical drying of zinc precursor wet-gel; (FIG. 5B) ZIF-8; and (FIG. 5C) MOF-5 aerogels prepared from the zinc precursor wet-gel according to the procedure describe in this disclosure. The insets in the SEM images are pictures of the aerogel blocks of the corresponding samples.

Figure 5D:
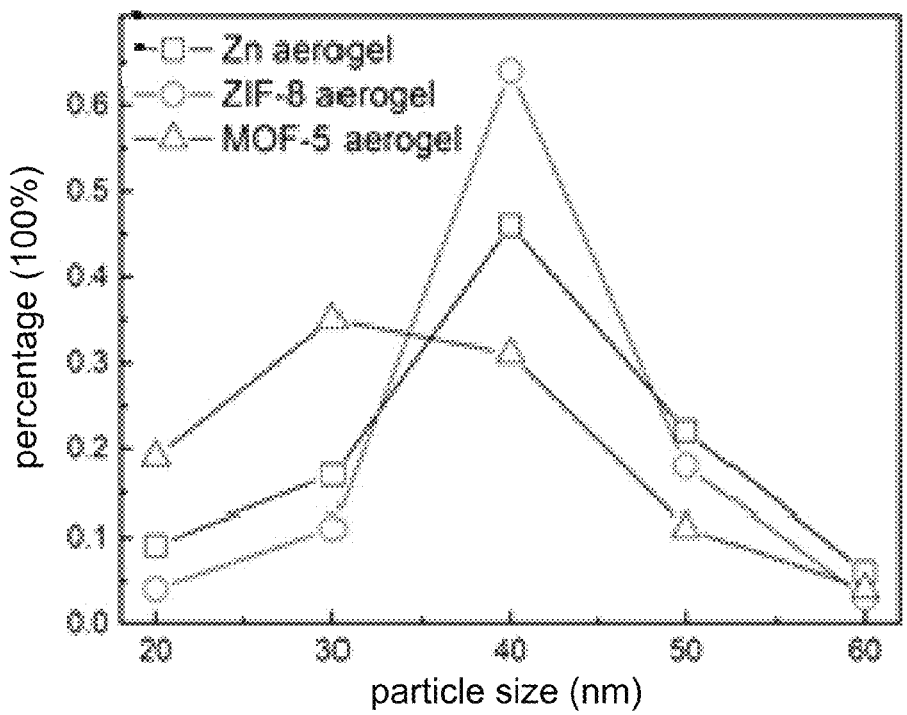
FIG. 5D is a graphic depiction showing article size distribution of the zinc precursor, ZIF-8 and MOF-5 aerogels shown in FIGS. 5A-5C.
Figure 6A:
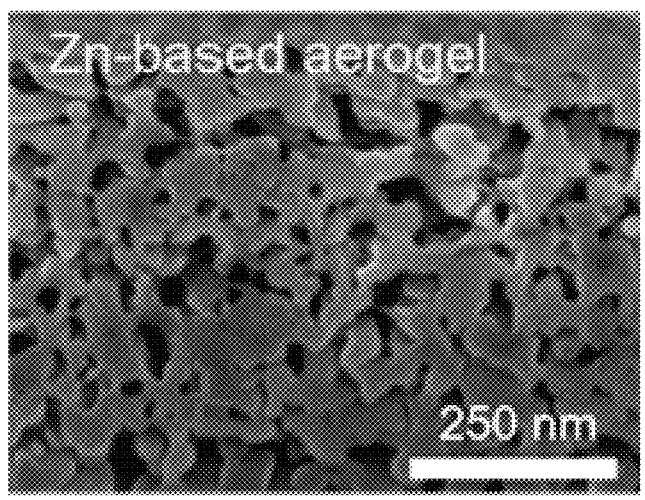
FIGS. 6A-6I are focus ion beam-scanning electron microscopy (FIB-SEM) analysis of a zinc precursor aerogels obtained from supercritical drying of zinc precursor wet-gel.
Figure 6B:
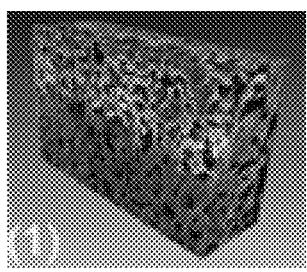
Figure 6C:
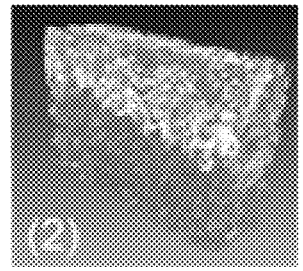
Figure 6D:
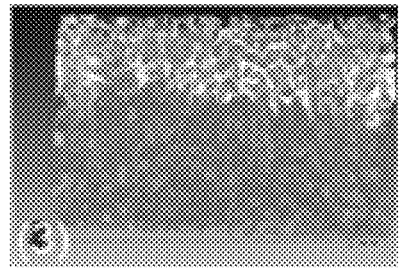
Figure 6E:
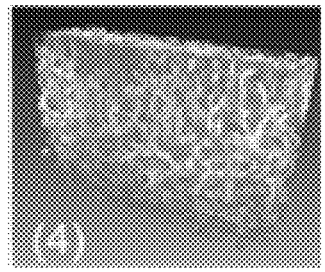
Figure 6F:
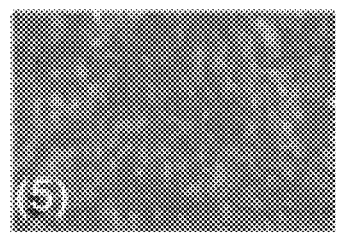
Figure 6G:
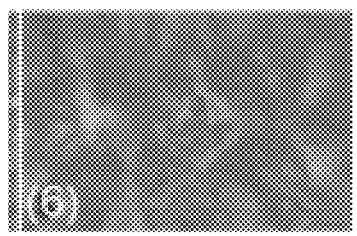
Figure 6H:
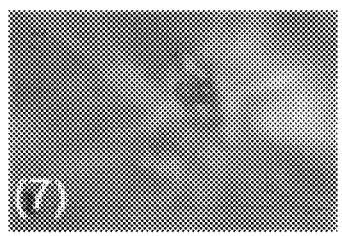
Figure 6I:
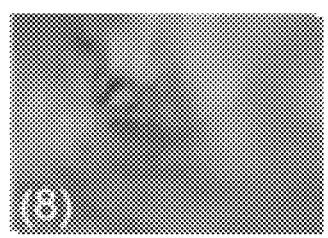
Figure 7A:
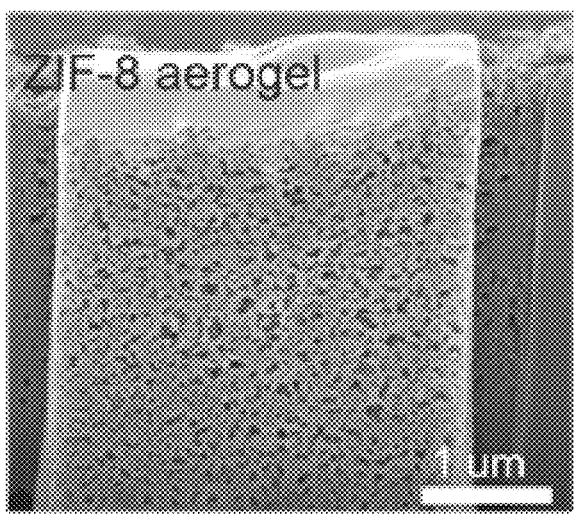
FIGS. 7A-7H are focus ion beam-scanning electron microscopy (FIB-SEM) analysis of a ZIF-8 aerogel prepared from zinc precursor aerogel.
Figure 7B:
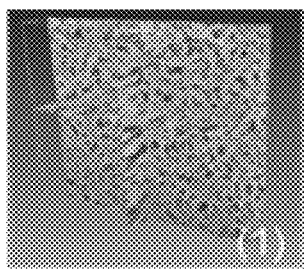
Figure 7C:
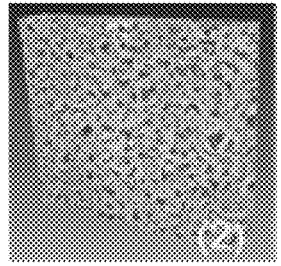
Figure 7D:
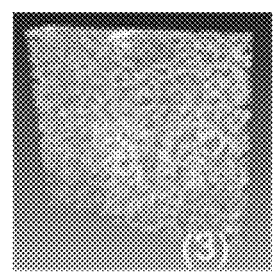
Figure 7E:
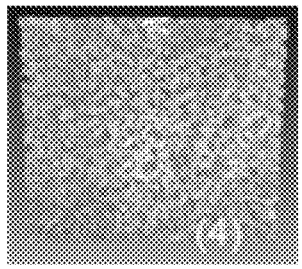
Figure 7F:
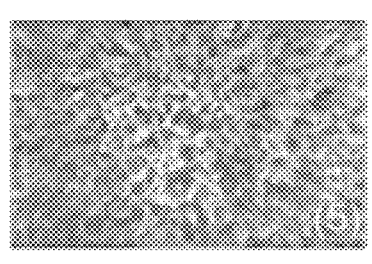
Figure 7G:
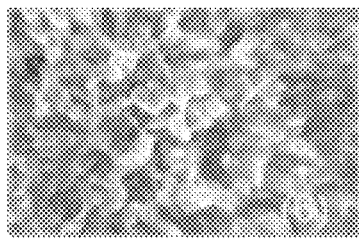
Figure 7H:
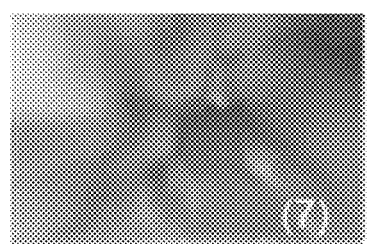
Figure 8A:
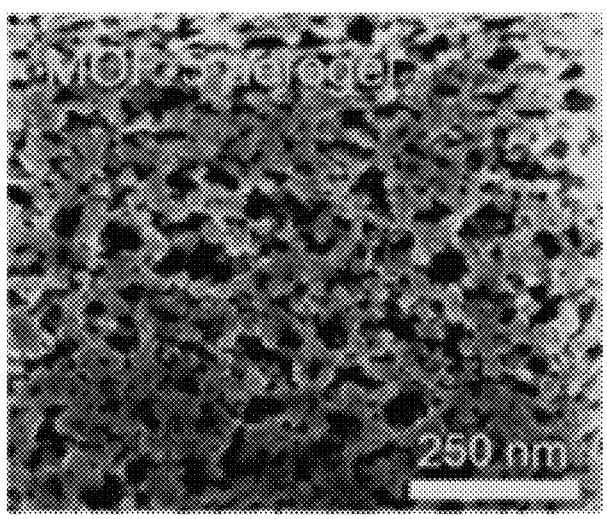
FIGS. 8A-8H are focus ion beam-scanning electron microscopy (FIB-SEM) analysis of a MOF-5 aerogel prepared from zinc precursor aerogel.
Figure 8B:
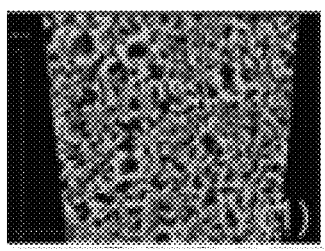
Figure 8C:
Figure 8D:
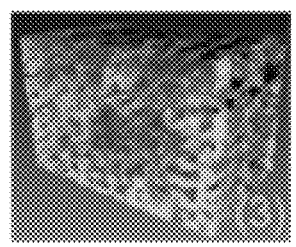
Figure 8E:
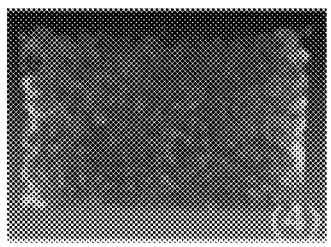
Figure 8F:
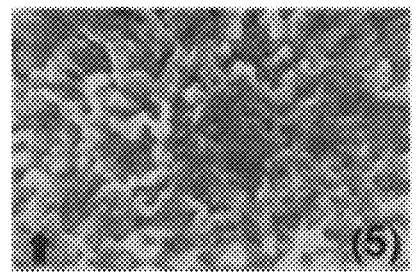
Figure 8G:
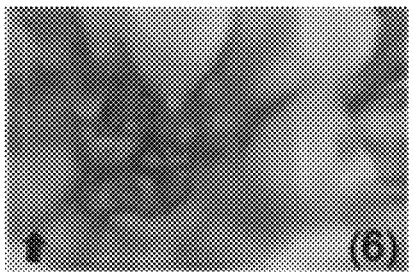
Figure 8H:
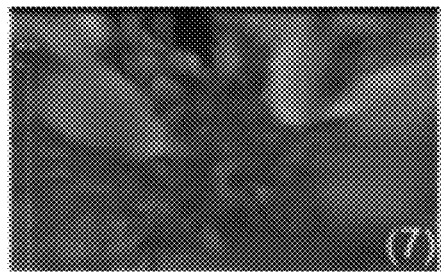

FIG. 5D is a graphic depiction showing article size distribution of the zinc precursor, ZIF-8 and MOF-5 aerogels shown in FIGS. 5A-5C. FIGS. 6A-6l are focus ion beam-scanning electron microscopy (FIB-SEM) analysis of a zinc precursor aerogels obtained from supercritical drying of zinc precursor wet-gel. FIG. 6A shows a Zn-based aerogel. FIGS. 6B-6l are 3D reconstruction images of the aerogel. FIGS. 7A-7H are focus ion beam-scanning electron microscopy (FIB-SEM) analysis of a ZIF-8 aerogel prepared from zinc precursor aerogel. FIG. 7A shows a ZIF-8-based aerogel. FIGS. 7B-7H are 3D reconstruction images of the aerogel. FIGS. 8A-8H are focus ion beam-scanning electron microscopy (FIB-SEM) analysis of a MOF-5 aerogel prepared from zinc precursor aerogel. FIG. 8A shows a MOF-5-based aerogel.

FIGS. 5-8 show the microstructure and porosity of the zinc precursor aerogel and the ZIF-8 and MOF-5 aerogels derived from the zinc precursor gel according to the procedure described in this disclosure. The 3D reconstructed images of the zinc precursor aerogel and ZIF-8 and MOF-5 aerogels indicate highly porous materials with interconnected channel networks.

Figure 9A:
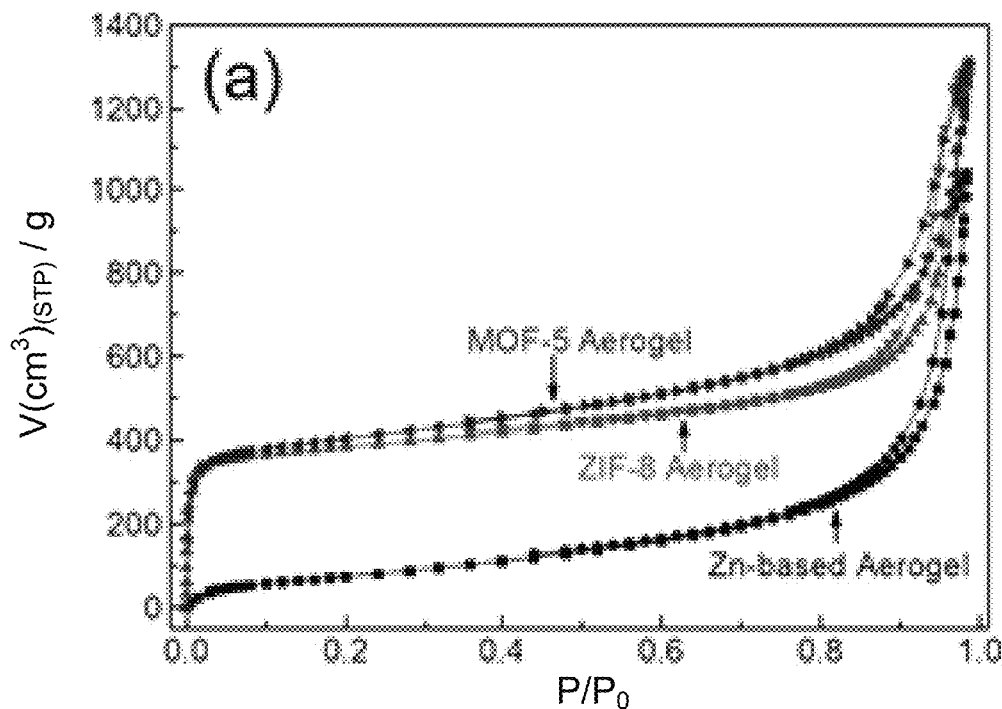
FIGS. 9A and 9B are graphic depictions of (FIG. 9A) nitrogen physisorption isotherm values.
Figure 9B:
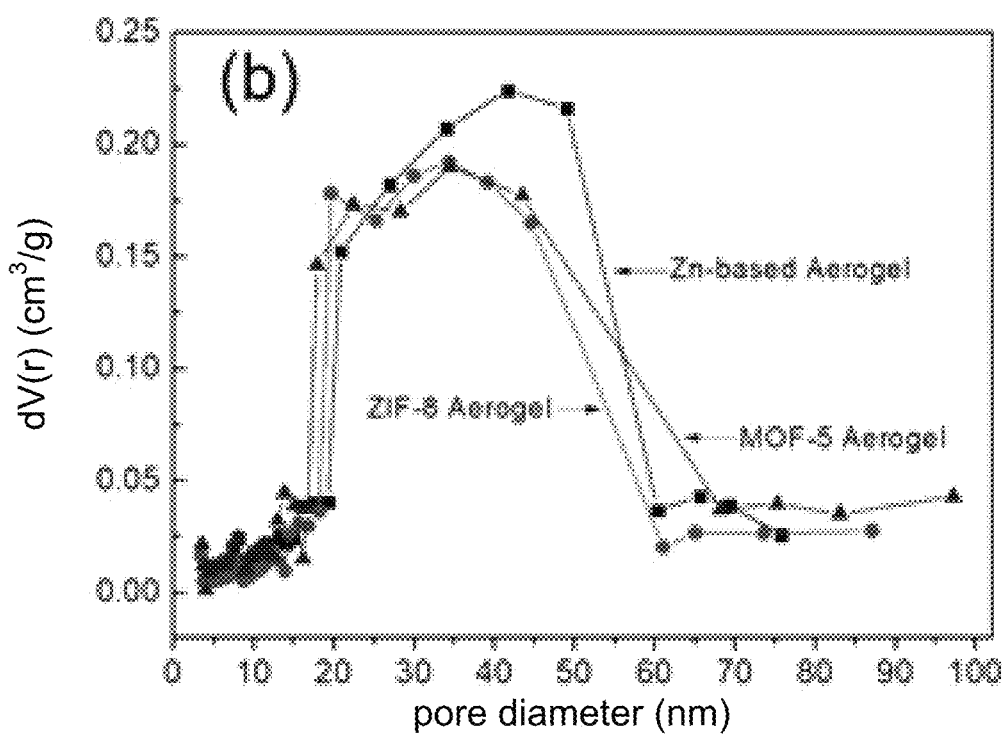

FIGS. 9A and 9B are graphic depictions of (FIG. 9A) nitrogen physisorption isotherm values; and (FIG. 9B) calculated pore size distribution for the zinc precursor aerogel from supercritical drying of zinc precursor wet-gel and the ZIF-8 and MOF-5 aerogels prepared from the zinc precursor wet-gel.

The nitrogen chemisorption isotherm in FIG. 9A give evidence to the creation of microporosity with the formation of the MOF materials, whereas FIG. 9B suggests that the pore distribution before and after the MOF transformation remain similar. The ZIF-8 and MOF-5 aerogels possess large specific surface areas of 1590 m$^2$/g and 1723 m$^2$/g, and mesopore volumes of 1.084 cm$^3$ and 0.962 cm$^3$, respectively.

Figure 10:
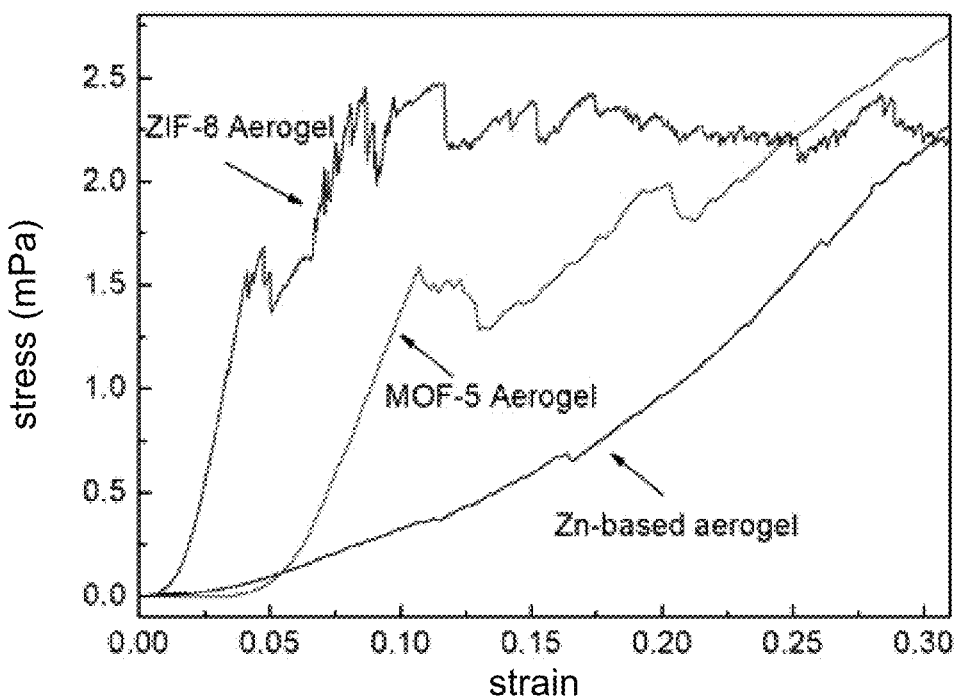
FIG. 10 is a graphic depiction of data from a load compression test on cylindrical aerogels.
Figure 11:
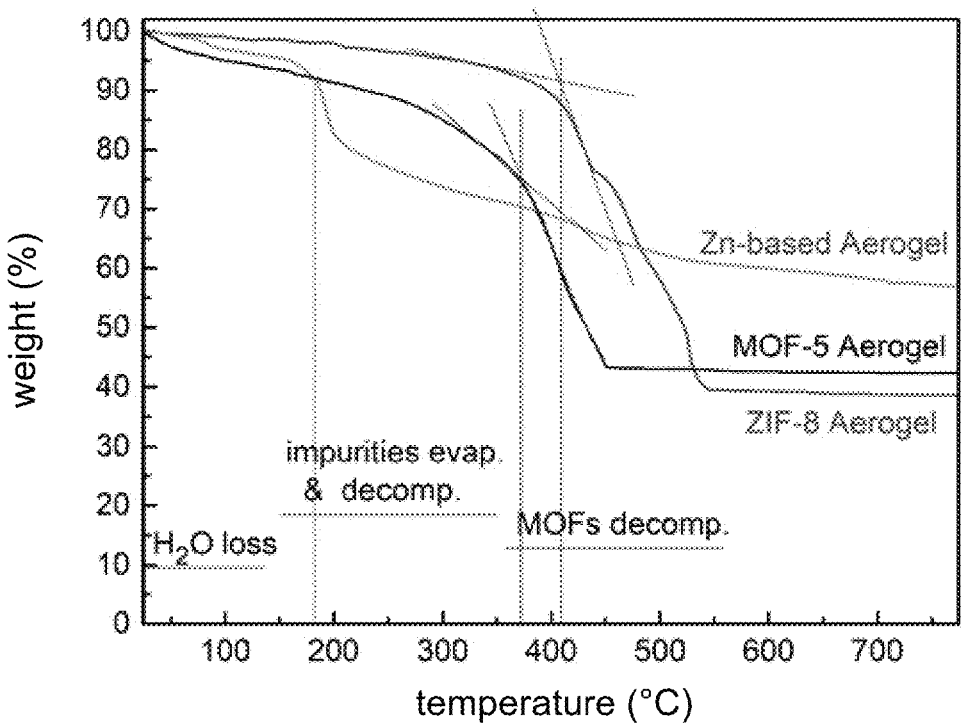
FIG. 11 is a graphic depiction of thermogravimetric data on the zinc precursor aerogel from supercritical drying of zinc precursor wet-gel and the ZIF-8 and MOF-5 aerogels prepared from the zinc precursor wet-gel.
Figure 12A:
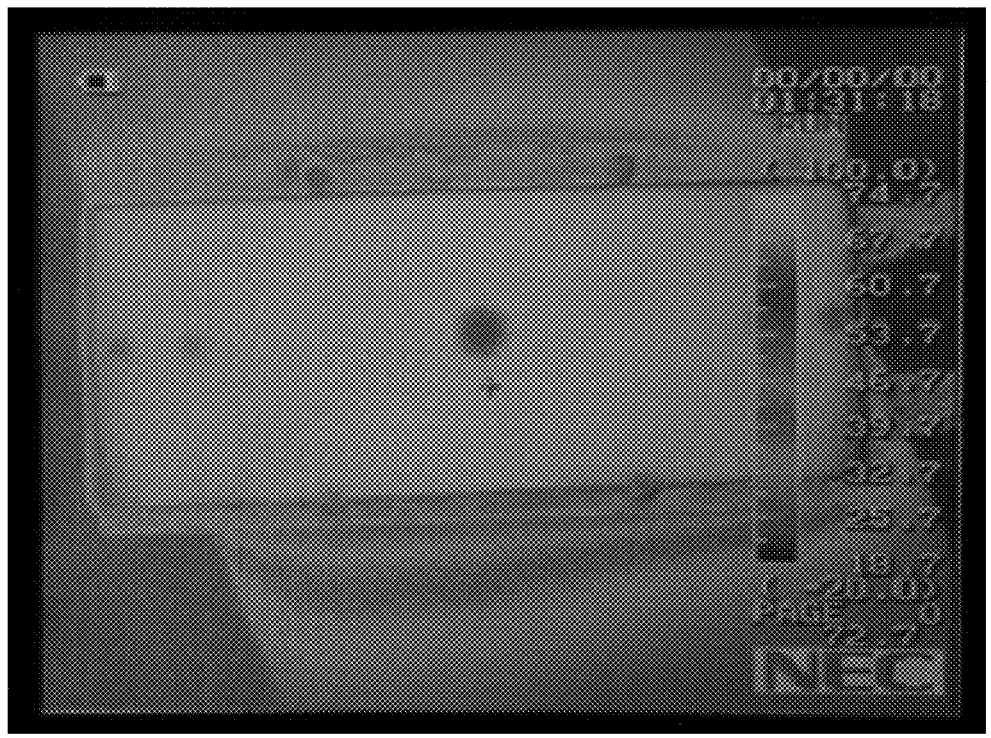
FIGS. 12A and 12B are infrared thermal images of (FIG. 12A) a heating unit.
Figure 12B:
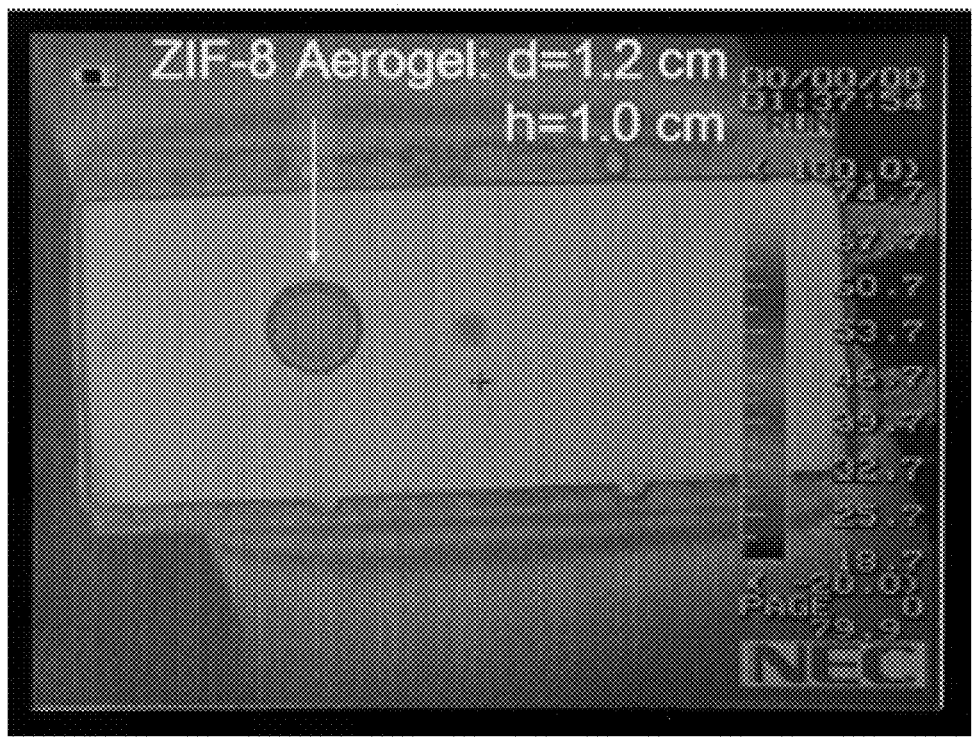

FIG. 10 is a graphic depiction of data from a load compression test on cylindrical aerogels. Of note, Zn-based aerogel (h=14.2 mm, d=12.4 mm), ZIF-8 aerogel (h=13.8 mm, d=12.2 mm), and MOF-5 aerogel (h=12.5 mm, d=11.8 mm) at a strain rate of 1 mm/min. FIG. 11 is a graphic depiction of thermogravimetric data on the zinc precursor aerogel from supercritical drying of zinc precursor wet-gel and the ZIF-8 and MOF-5 aerogels prepared from the zinc precursor wet-gel. FIGS. 12A and 12B are infrared thermal images of (FIG. 12A) a heating unit; and (FIG. 12B) a ZIF-8 aerogel (12 mm OD, 10 mm height) placed on the heating plate.

Mechanical tests in FIG. 10 show a distinct difference in the mechanical behavior of the material following crystallization of MOFs. The MOF aerogels have a Young's modulus greater than 40 MPa. Similarly, the thermogravimetric analysis in FIG. 11 show distinct weight lost in the MOF aerogels that is related to the removal and oxidation of the organic ligands. Weight loss calculations indicate that better than 75% of the original zinc in the precursor gel has been converted into MOFs under the given preparation conditions. FIGS. 12A and 12B demonstrate that the prepared MOF aerogels exhibit similar thermal insulation properties of aerogel materials.

Figure 13C:
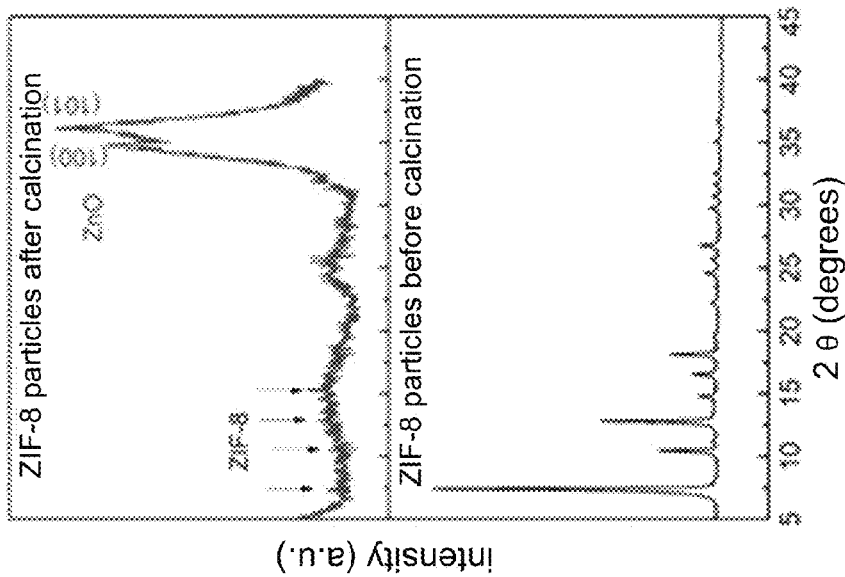
FIGS. 13A-13C are graphic depictions of X-ray diffraction of (FIG. 13A) ZIF-8 aerogel.
Figure 13B:
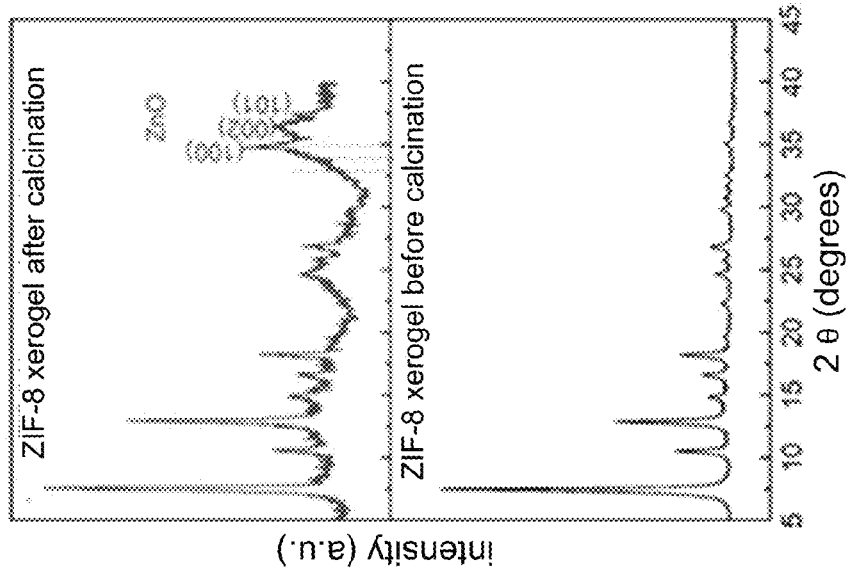
Figure 13A:
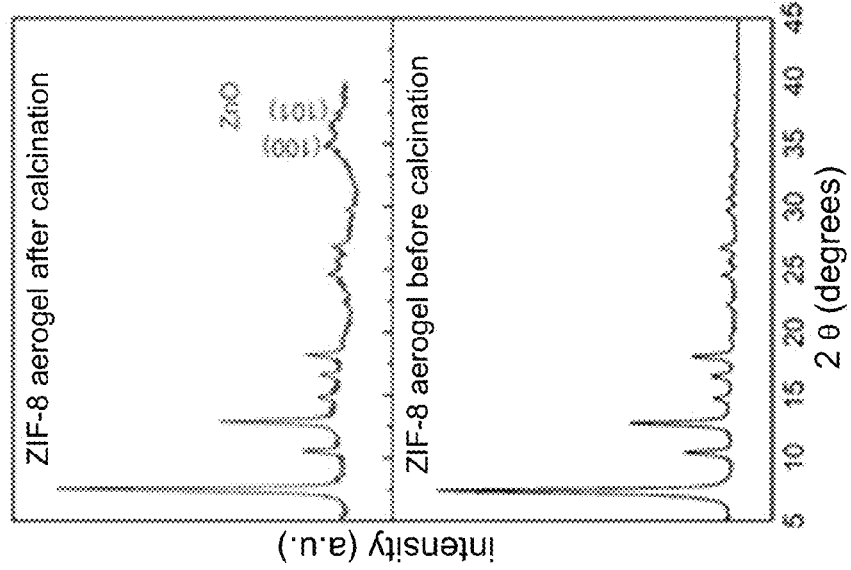
Figure 14A:
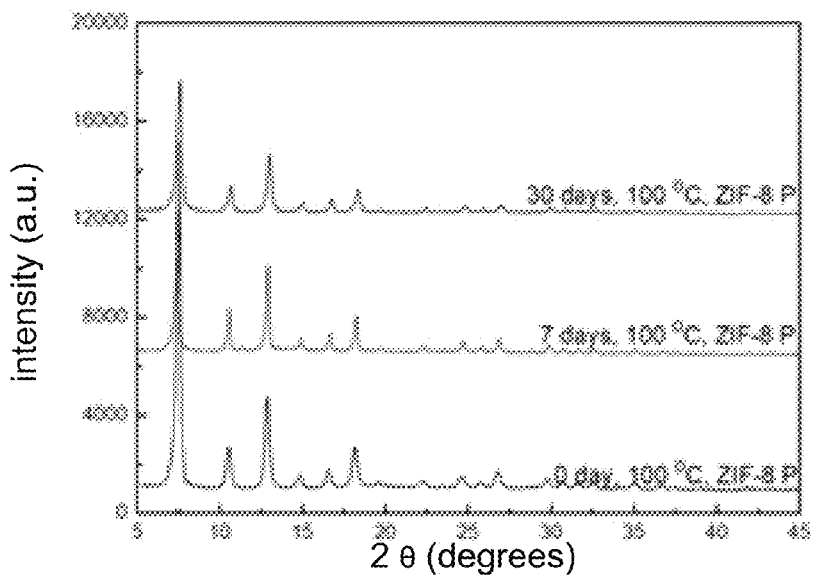
FIGS. 14A-14D are graphic depictions of X-ray diffraction of (FIG. 14A) ZIF-8 powder.
Figure 14B:
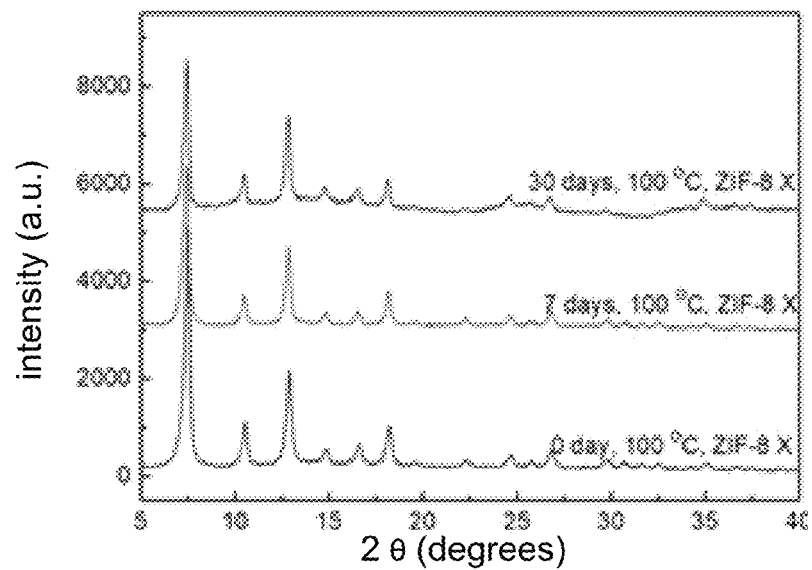
Figure 14C:
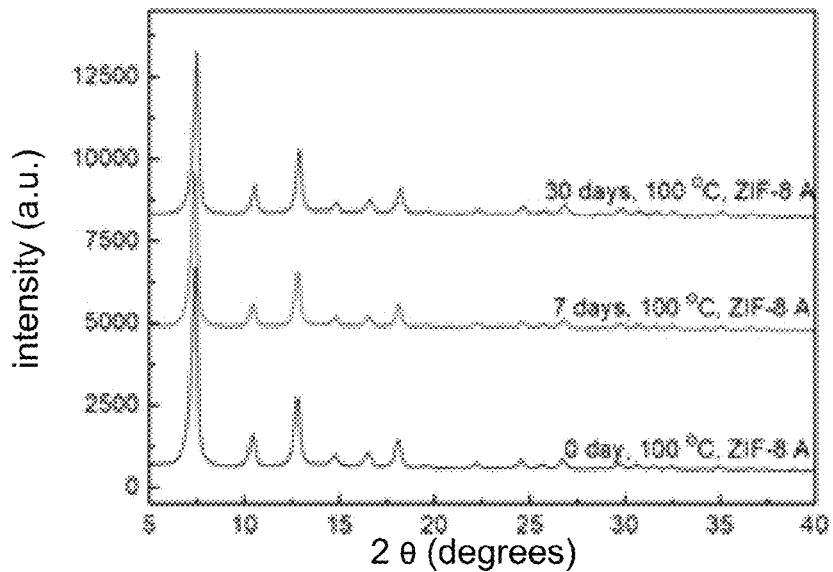
Figure 14D:
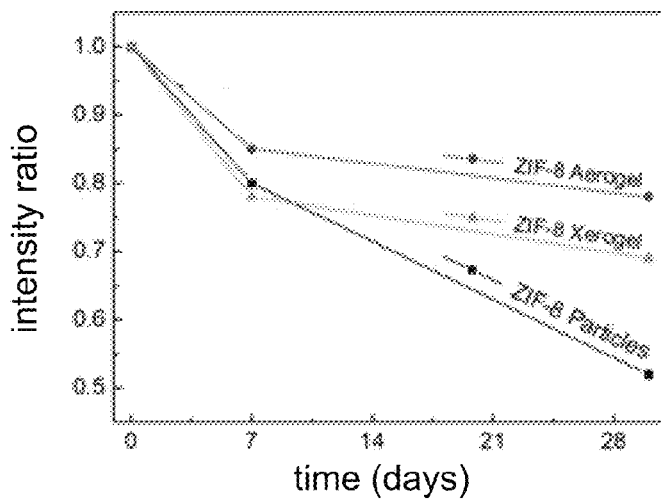

FIGS. 13A-13C are graphic depictions of X-ray diffraction of (FIG. 13A) ZIF-8 aerogel; (FIG. 13B) ZIF-8 xerogel; and (FIG. 13C) ZIF-8 powder before (bottom diffractograms) and after (upper diffractograms) heat treatment at 350° C. for 1 hour. FIGS. 14A-14D are graphic depictions of X-ray diffraction of (FIG. 14A) ZIF-8 powder; (FIG. 14B) ZIF-8 xerogel; and (FIG. 14C) ZIF-8 aerogel with exposure to boiling water for 7 and 30 days. FIG. 14D shows plots of the change in the intensity ratio of characteristic diffraction peak at 2θ=7.4°. The MOF aerogels display better thermal and hydrothermal stability as shown in FIGS. 13 and 14, respectively.

Figure 15A:
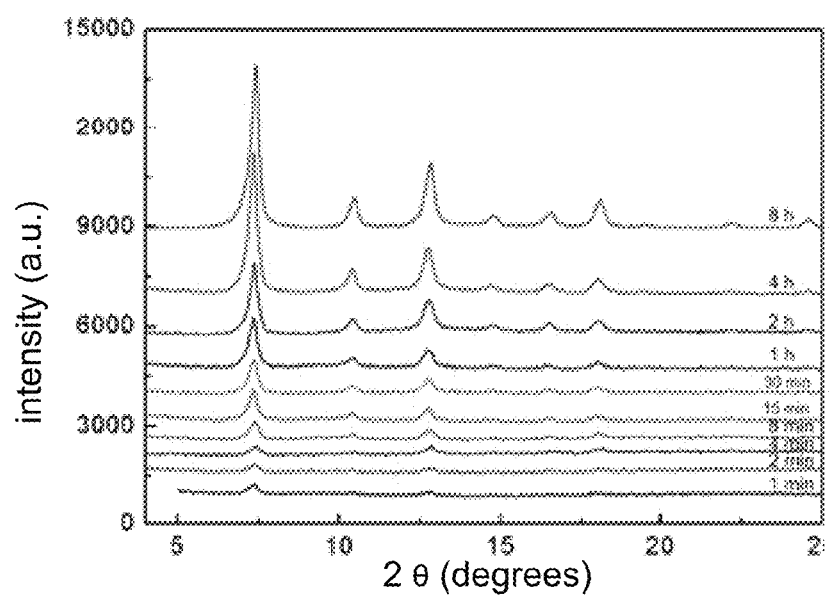
FIGS. 15A and 15B are graphic depictions of X-ray diffraction of the transformation of zinc precursor gel into (FIG. 15A) ZIF-8 and (FIG. 15B) MOF-5 wet gels vs. time.
Figure 15B:
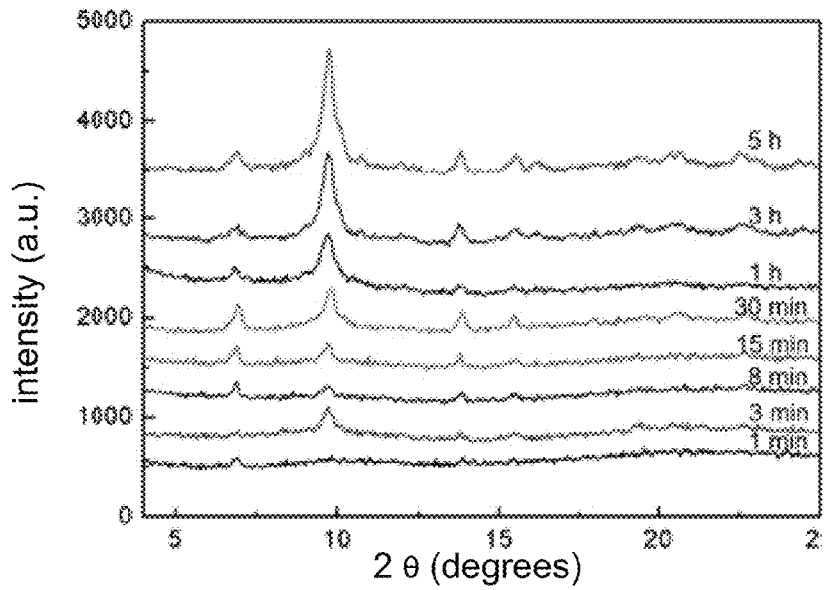
Figure 16A:
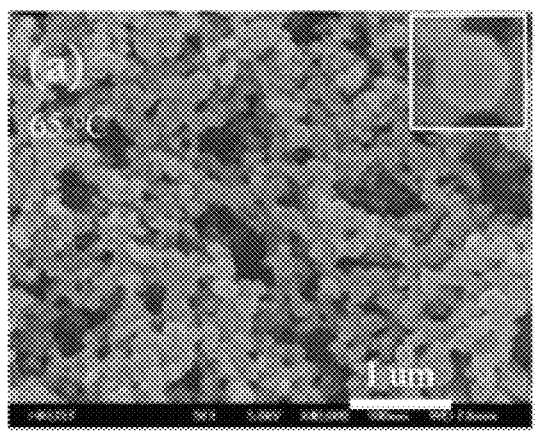
FIGS. 16A-16F are scanning electron microscopy (SEM) images of ZIF-8 and MOF-5 aerogels following transformation at temperatures.
Figure 16B:
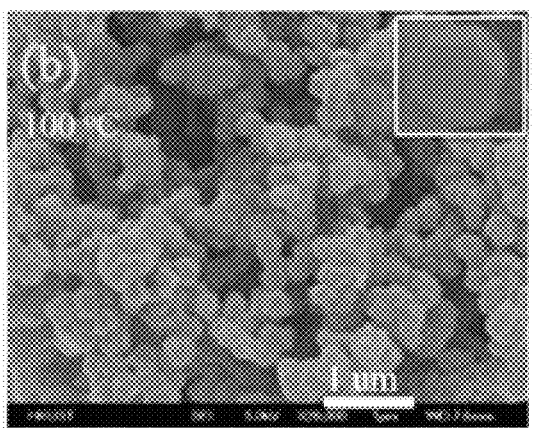
Figure 16C:
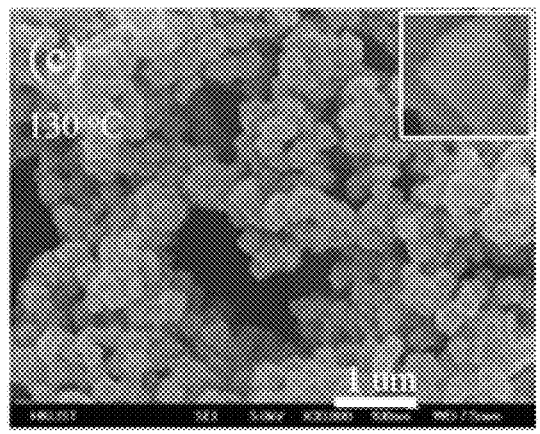

FIGS. 15A and 15B are graphic depictions of X-ray diffraction of the transformation of zinc precursor gel into (FIG. 15A) ZIF-8 and (FIG. 15B) MOF-5 wet gels vs. time. FIGS. 16A-16F are scanning electron microscopy (SEM) images of ZIF-8 and MOF-5 aerogels following transformation at temperatures. FIGS. 16A-16C are SEM images of ZIF-8 aerogels following transformation at temperatures of:
FIG. 16A—65° C.
FIG. 16B—100° C.
FIG. 16C—130° C.

Figure 16D:
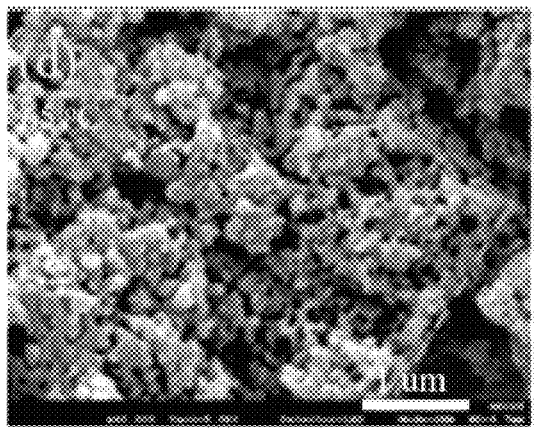
Figure 16E:
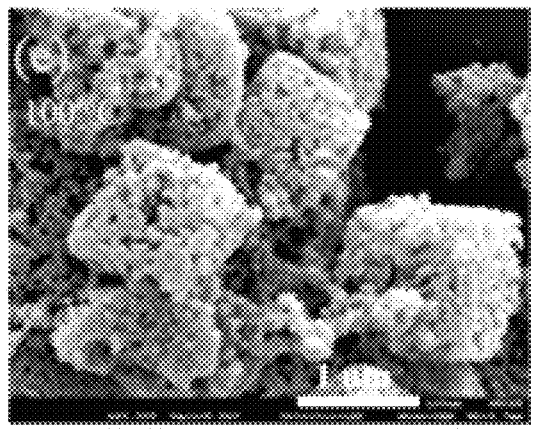
Figure 16F:
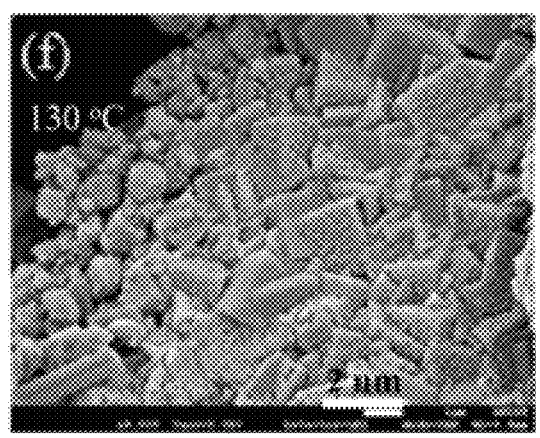

FIGS. 16D-16F are SEM images of MOF-5 aerogels following transformation at temperatures of:
FIG. 16D—65° C.
FIG. 16E—100° C.
FIG. 16F—130° C.

The insets show corresponding individual ZIF-8 crystallites. FIGS. 15 and 16 give evidence to the transformation of the metal precursor gel network into MOF materials using the procedure describe in this disclosure.

Figure 17:
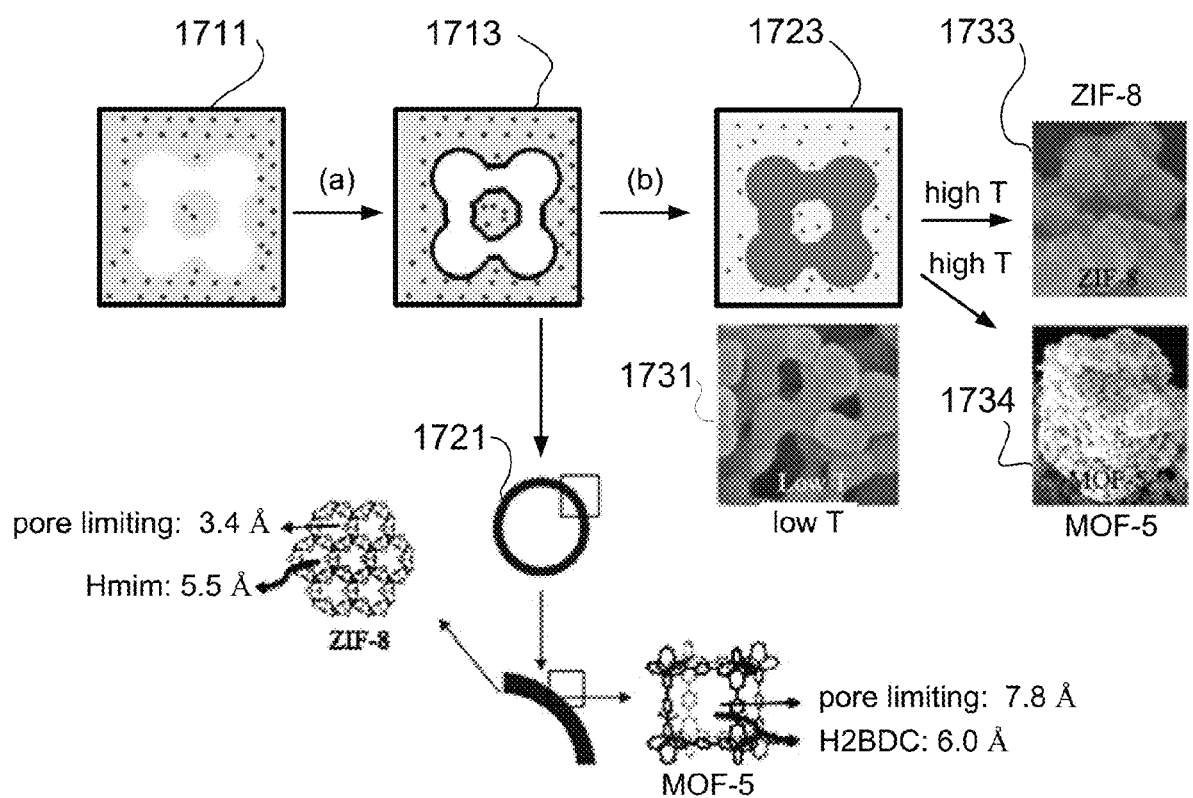
FIG. 17 is a schematic diagram showing the crystallization of MOFs during the conversion of the zinc precursor gel to MOF wet gel.

FIG. 17 is a schematic diagram showing the crystallization of MOFs during the conversion of the zinc precursor gel to metal-organic framework (MOF) wet gel. A zinc precursor 1711 is provided and is converted to the MOF 1713 through an aging process.

The MOF 1713 comprises individual zinc MOF gel particles 1721. In a non-limiting example, MOF 1713 and MOF gel particles 1721 are produced by employing 2-methylimidazole (Hmim) as ligand. The shell is ZIF-8, and the formed micropores allow diffusion of Hmim to further react with core zinc precursor until complete conversion.

In another non-limiting example, MOF 1713 and MOF gel particles 1721 are produced by employing terephthalic acid (H$_2$BDC) as ligand. The shell is MOF-5, and the formed micropores allow diffusion of H$_2$BDC to further react with core zinc precursor until complete conversion.

This is followed by removal of the unreacted ligands by washing steps and the removal of the solvents by a supercritical drying to produce a metal-organic framework aerogel 1723. A conversion reaction is performed to render a MOF aerogel. If the conversion reaction is performed at low temperature, the MOF gel network is preserved, to render a structure such as shown at 1731. If the conversion is performed at high temperature, MOF crystallization occurs, to render a structure such as shown at 1733 for ZIF-8 or at 1734 for MOF-5.

Figure 18A:
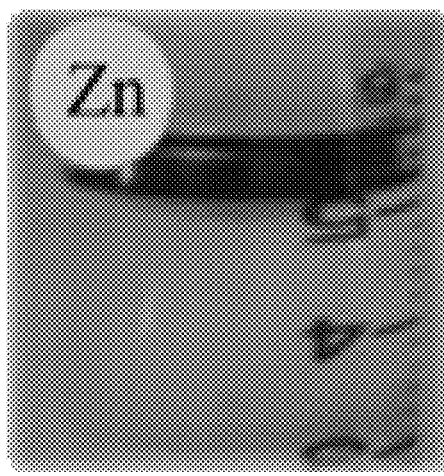
FIGS. 18A-18E are photographic images of a zinc precursor gel and the prepared aerogels from its transformation.
Figure 18B:
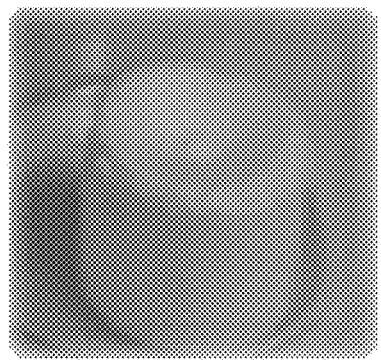
Figure 18C:
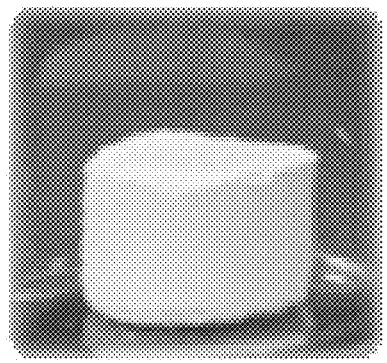
Figure 18D:
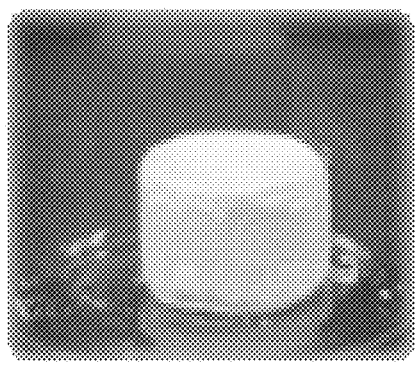
Figure 18E:
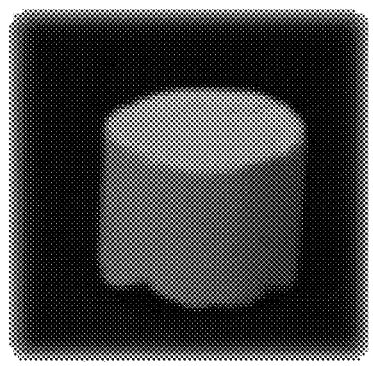
Figure 19A:
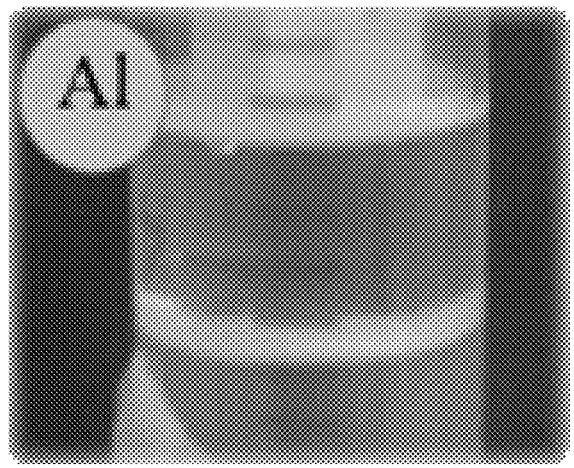
FIGS. 19A-19C are photographic images of an aluminum precursor gel and the prepared aerogels from its transformation.
Figure 19B:
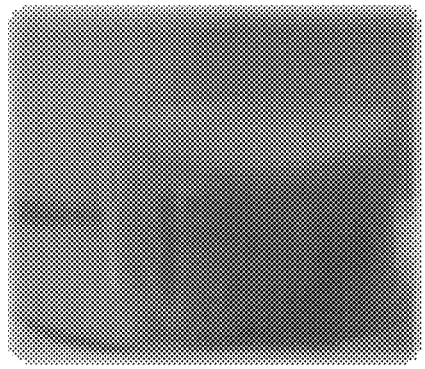
Figure 19C:
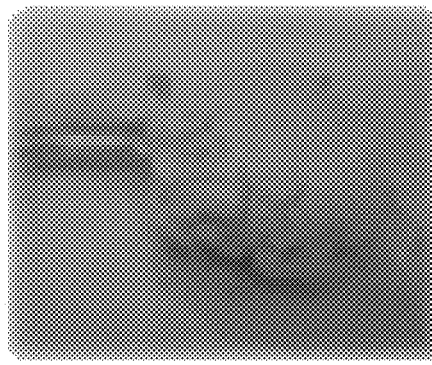
Figure 20A:
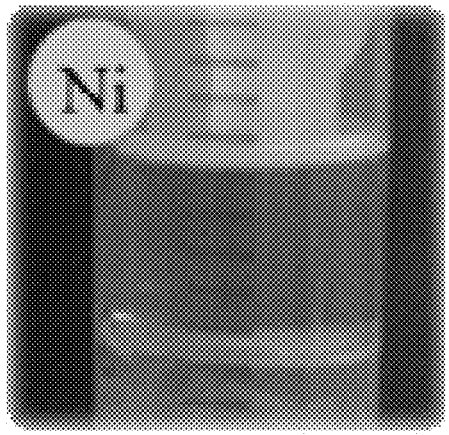
FIGS. 20A-20D are photographic images of (FIG. 20A) nickel.
Figure 20B:
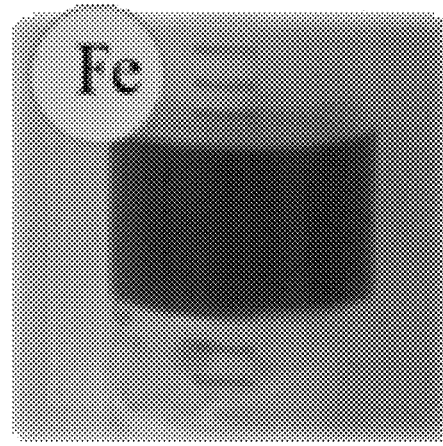
Figure 20C:
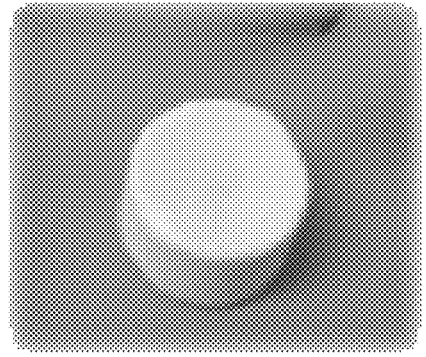
Figure 20D:

FIGS. 18A-18E are photographic images of a zinc precursor gel and the prepared aerogels from its transformation. FIG. 18A shows the zinc precursor gel. FIGS. 18B-18E are photographic images of (FIG. 18B) the prepared ZIF-7; (FIG. 18C) ZIF-90; (FIG. 18D) MOF-74; and (FIG. 18E) IRMOF-3 aerogels. FIGS. 19A-19C are photographic images of an aluminum precursor gel and the prepared aerogels from its transformation. FIG. 19A shows the aluminum precursor gel. FIGS. 19B and 19C show the prepared MIL-53 and NH$_2$-MIL-53 aerogels from the transformations. FIGS. 20A-20D are photographic images of (FIG. 20A) nickel; (FIG. 20B) iron precursor gels; and (FIGS. 20C and 20D) the respective MOF-74 and MIL-100 aerogels produced from the transformations.

The described procedure can be used to prepare aerogels of Zn-containing MOFs such as ZIF-7, ZIF-90, MOF-74 and IRMOF-3 (FIG. 18), aluminum-containing MOFs such as MIL-53 and NH$_2$-MIL-53 (FIG. 19), the nickel-containing MOF-74 and iron-containing MIL 100 (FIG. 20).

Figure 21:
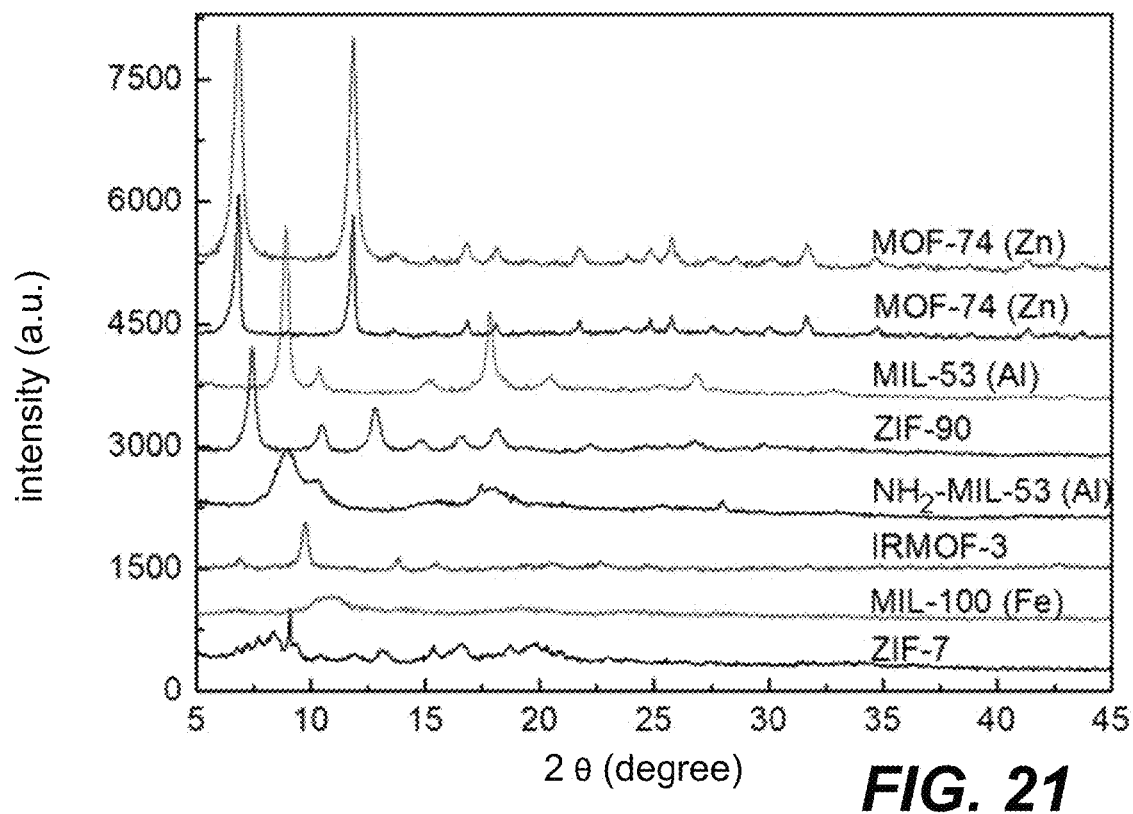
FIG. 21 is a graphic depiction of X-ray diffraction of MOF aerogels prepared according to the procedure describe in this disclosure.
Figure 22:
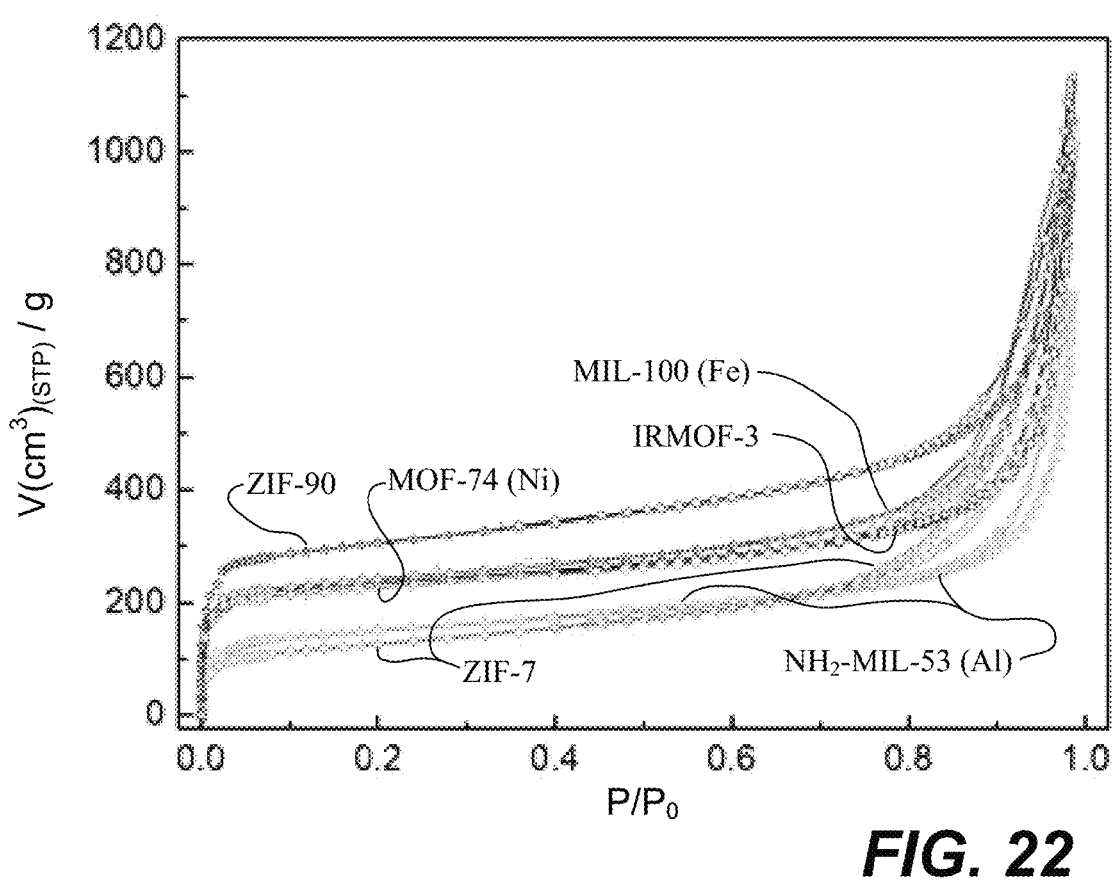
FIG. 22 is a graphic depiction of nitrogen physisorption isotherms of MOF aerogels prepared according to the procedure describe in this disclosure.

FIG. 21 is a graphic depiction of X-ray diffraction of MOF aerogels prepared according to the described process. FIG. 22 is a graphic depiction of nitrogen physisorption isotherms of MOF aerogels prepared according to the procedure describe in this disclosure. The x-ray diffraction and nitrogen physisorption isotherms of these MOF aerogels are shown in FIGS. 21 and 22, respectively.

Table 1 summarizes the properties of some of the MOF aerogels prepared according to the procedure described in this disclosure. The MOF aerogels are lightweight with density not exceeding 0.5 g/cm$^3$, can be formed into different freestanding shape and characterized by their large pore volume (>0.3 cm$^3$/g). Shown are the materials and corresponding MOF, shrinkage diameters, densities, Brunauer-Emmett-Teller (BET) surface areas, and mesopore dimensions.

TABLE 1

| metal | MOFs | shrinkage (diameter) | density (g/cm$^3$) | BET surface area (m$^2$/g) | mesopore vol. (cm$^3$/g) | mesopore size (nm) |
|---|---|---|---|---|---|---|
| Zn | ZIF-8 | <5% | 0.152 | 1590 | 1.084 | 46 |
| Zn | MOF-5 | <5% | 0.183 | 1723 | 0.962 | — |
| Zn | ZIF-7A | <5% | 0.173 | 479.2 | 0.777 | 23 |
| Zn | ZIF-90A | <5% | 0.163 | 1534.6 | 0.632 | 37 |
| Zn | IRMOF-3A | 12% | 0.182 | 1106.1 | 0.598 | 41 |
| Zn | MOF-74A | 11% | 0.235 | 974.6 | 0.614 | 25 |
| Al | MIL-53A | 17% | 0.193 | — | — | — |
| Al | NH$_2$-MIL-53A | 14% | 0.159 | 526.7 | 0.782 | 22 |
| Ni | MOF-74A | <5% | 0.184 | 1067.6 | 0.716 | 32 |
| Fe | MIL-100A | 15% | 0.224 | 1354.4 | 0.313 | 33 |

Examples—Fabrication of Metal Precursor Gels

The metal precursor gels were prepared by sol-gel method using a gelation agent such as propylene oxide, urea and citrate. While epoxides, i.e., propylene oxide, were used for sol-gel preparation, this is a non-limiting example, as other materials, for example urea and citrate, can also be used to induce sol-gel reactions and hence sol-gel preparation.

Example 1—Zn Alcogel Prepared by Propylene Oxide Addition Method

Zn-based wet gel: 0.8 mmol Zn salts (0.65 mmol zinc nitrate hexahydrate and 0.15 mmol zinc chloride) are dispersed in 1.25 ml ethanol containing 3.2% wt polyacrylic acid (PAA), 0.56 ml propylene oxide is added and stirred for 5 min.; gelation of the dispersion occurred after 1 hour.

Example 2—Zn Alcogel Prepared by 1,2-Epoxide Butane Addition Method

Zn-based wet gel: 0.8 mmol Zn salts (0.65 mmol zinc nitrate hexahydrate and 0.15 mmol zinc chloride) are dispersed in 1.25 ml ethanol containing 3.2% wt polyacrylic acid (PAA), 0.69 ml 1,2-epoxide butane is added and stirred for 5 min.; gelation of the dispersion occurred after 1 hour.

Example 3—Al Alcogel Prepared by Propylene Oxide Addition Method

Al-based wet gel: 0.225 g alumina nitrate nonahydrate is dispersed into a mixture of 1.0 ml methanol and 0.25 ml H$_2$O, 0.46 ml propylene oxide is added and stirred for 5 min.; gelation of the dispersion occurred after 2 days.

Example 4—Al Alcogel Prepared by 1,2-Epoxide Butane Addition Method

Al-based wet gel: 0.225 g alumina nitrate nonahydrate is dispersed into a mixture of 1.0 ml methanol and 0.25 ml H$_2$O, 0.57 ml 1,2-epoxide butane is added and stirred for 5 min.; gelation of the dispersion occurred after 2 days.

Example 5—Ni Alcogel Prepared by Propylene Oxide Addition Method

Ni-based wet gel: 0.19 g nickel salt is dispersed into 1.28 ml methanol; then 0.56 ml propylene oxide is added and stirred for 5 min.; gelation of the dispersion occurred after 20 hours.

Example 6—Ni Alcogel Prepared by 1,2-Epoxide Butane Addition Method

Ni-based wet gel: 0.19 g nickel salt is dispersed into 1.28 ml methanol; then 0.69 ml 1,2-epoxide butane is added and stirred for 5 min.; gelation of the dispersion occurred after 20 hours.

Example 7—Fe Alcogel Prepared by Propylene Oxide Addition Method

Fe-based wet gel: 0.162 g iron chloride hexahydrate salt is dispersed into a mixture of 1.20 ml ethanol and 0.15 ml H$_2$O; then 0.56 ml propylene oxide is added and shaken for 30 sec.; gelation of the dispersion occurred after 2 min.

Example 8—Fe Alcogel Prepared by 1,2-Epoxide Butane Addition Method

Fe-based wet gel: 0.162 g iron chloride hexahydrate salt is dispersed into a mixture of 1.20 ml ethanol and 0.15 ml H$_2$O; then 0.69 ml 1,2-epoxide butane is added and shaken for 30 sec.; gelation of the dispersion occurred after 4 min.

Example 9—Cu Alcogel Prepared by Propylene Oxide Addition Method

Cu-based wet gel: 0.155 g copper chloride salt is dispersed into 1.15 ml ethanol containing 0.02 g polyacrylic acid (PAA); then 0.35 ml propylene oxide is added and shaken for 30 sec.; gelation of the dispersion occurred after 3 min.

Example 10—Cu Alcogel Prepared by 1,2-Epoxide Butane Addition Method

Cu-based wet gel: 0.155 g copper chloride salt is dispersed into 1.15 ml ethanol containing 0.02 g polyacrylic acid (PAA); then 0.43 ml 1,2-epoxide butane is added and shaken for 30 sec.; gelation of the dispersion occurred after 6 min.

Example 11—Cr Alcogel Prepared by Propylene Oxide Addition Method

Cr-based wet gel: 0.24 g chromium nitrate nonahydrate was dissolved into 1.0 ml methanol, 0.56 ml propylene oxide was added and stirred for 5 min.; gelation of the dispersion occurred after 10 hours.

Example 12—Cr Alcogel Prepared by 1,2-Epoxide Butane Addition Method

Cr-based wet gel: 0.24 g chromium nitrate nonahydrate was dissolved into 1.0 ml methanol, 0.69 ml 1,2-epoxide butane was added and stirred for 5 min.; gelation of the dispersion occurred after 18 hours.

Example 13—Zr Alcogel Prepared by Propylene Oxide Addition Method

Zr-based wet gel: 0.186 g zirconium chloride was dissolved into 1.25 ml water/ethanol (1:1 v/v) mixture, 0.28 ml propylene oxide was added and stirred for 30 sec.; gelation of the dispersion occurred within 1 min.

Example 14—Zr Alcogel Prepared by 1,2-Epoxide Butane Addition Method

Zr-based wet gel: 0.186 g zirconium chloride was dissolved into 1.25 ml water/ethanol (1:1 v/v) mixture, 0.34 ml 1,2-epoxide butane was added and stirred for 30 sec.; gelation of the dispersion occurred after 2 min.

Example 15—Ce Alcogel Prepared by Propylene Oxide Addition Method

Ce-based wet gel: 0.347 g cerium nitrate hexahydrate was dissolved into 1.25 ml ethanol containing 0.02 g polyacrylic acid (PAA), 0.56 ml propylene oxide was added and stirred for 30 sec.; gelation of the dispersion occurred after 10 hours.

Example 16—Ce Alcogel Prepared by 1,2-Epoxide Butane Addition Method

Ce-based wet gel: 0.347 g cerium nitrate hexahydrate was dissolved into 1.25 ml ethanol containing 0.02 g polyacrylic acid (PAA), 0.69 ml 1,2-epoxide butane was added and stirred for 30 sec.; gelation of the dispersion occurred after 14 hours.

Example 17—Co Alcogel Prepared by Propylene Oxide Addition Method

Co-based wet gel: 0.146 g cobalt nitrate hexahydrate was dissolved into 1.25 ml ethanol containing 0.02 g polyacrylic acid (PAA), 0.49 ml propylene oxide was added and stirred for 30 sec.; gelation of the dispersion occurred within 30 min.

Example 18—Co Alcogel Prepared by 1,2-Epoxide Butane Addition Method

Co-based wet gel: 0.146 g cobalt nitrate hexahydrate was dissolved into 1.25 ml ethanol containing 0.02 g polyacrylic acid (PAA), 0.60 ml 1,2-epoxide butane was added and stirred for 30 sec.; gelation of the dispersion occurred after 1.5 hour.

Examples—Fabrication of MOF Aerogels

Example 19—ZIF-7 Aerogel

The Zn-based gel is put into 8 ml dimethylformamide (DMF) solution containing 0.25 mol/L benezen-imidazole and keep still at room temperature for 36 hours, the wet gel is then washed with DMF, methanol, and ethanol or acetone, for 3 times, respectively, with solvents exchanged 3 times per day, and dried supercritically to produce a ZIF-7 aerogel.

Example 20—ZIF-8 Aerogel

The Zn-based gel was put into 8 ml DMF solution containing 0.25 mol/L 2-methyl-imidazole and keep still at room temperature for 36 hours, the wet gel is then washed with DMF, methanol, and ethanol or acetone, for 3 times, respectively, with solvents exchanged 3 times per day, and dried supercritically to produce a ZIF-8 aerogel.

Example 21—ZIF-90 Aerogel

The Zn-based gel is put into 8 ml DMF solution containing 0.3 mol/L Imidazole-2-carboxaldehyde (ICA) and keep still at room temperature for 12 hours and then 80° C. for 24 hours, the wet gel is then washed with DMF, methanol, and ethanol or acetone, for 3 times, respectively, with solvents exchanged 3 times per day, and dried supercritically to produce a ZIF-90 aerogel.

Example 22—MOF-5 Aerogel

MOF-5: The Zn-based gel was put into 8 ml DMF solution containing 0.15 mol/L terephthalic acid (BDC) and keep still at room temperature for 12 hours and then 50° C. for 24 hours, the wet gel is then washed with DMF, methanol, and ethanol or acetone, for 3 times, respectively, with solvents exchanged 3 times per day, and dried supercritically to produce a MOF-5 aerogel.

Example 23—MOF-74 Aerogel

MOF-74: The Zn-based gel is put into 8 ml DMF solution containing 0.25 mol/L 2,5-dioxido-1,4-benzenedicarboxylate (DOBDC) and keep still at 50° C. for 36 hours, the wet gel is then washed with DMF, methanol, and ethanol or acetone, for 3 times, respectively, with solvents exchanged 3 times per day, and dried supercritically to produce a MOF-74 (Zn) aerogel.

Example 24—IRMOF-3 Aerogel

IRMOF-3: The Zn-based gel is put into 8 ml DMF solution containing 0.15 mol/L $NH_2$-terephthalic acid ($NH_2$—BDC) and keep still at room temperature for 12 hours and then 50° C. for 24 hours, the wet gel is then washed with DMF, methanol, and ethanol or acetone, for 3 times, respectively, with solvents exchanged 3 times per day, and dried supercritically to produce a IRMOF-3 aerogel.

Example 25—MIL-53 (Al) Aerogel

The Al-based gel is put into 6 ml DMF:$H_2O$ (5:1) solution containing 0.08 g terephthalic acid (BDC) and keep still at room temperature for 12 hours and then 100° C. for 48 hours, the wet gel is then washed with DMF, methanol, and ethanol or acetone, for 3 times, respectively, with solvents exchanged 3 times per day, and dried supercritically to produce a MIL-53 (Al) aerogel.

Example 26—$NH_2$-MIL-53 (Al) Aerogel $NH_2$-MIL-53 (Al): The Al-based gel is put into 6 ml DMF:$H_2O$ (5:1) solution containing 0.08 g $NH_2$—BDC and keep still at room temperature for 12 hours and then 100° C. for 48 hours, the wet gel is then washed with DMF, methanol, and ethanol or acetone, for 3 times, respectively, with solvents exchanged 3 times per day, and dried supercritically to produce a $NH_2$-MIL-53 (Al) aerogel.

Example 27—MIL-101 (Al) Aerogel

The Al-based gel is put into 10 ml DMF solution containing 0.096 g terephthalic acid (BDC) and keep still at room temperature for 12 hours and then 110° C. for 48 hours, the wet gel is then washed with DMF, methanol, and ethanol or acetone, for 3 times, respectively, with solvents exchanged 3 times per day, and dried supercritically to produce a MIL-101 (Al) aerogel.

Example 28—$NH_2$-MIL-101 (Al) Aerogel $NH_2$-MIL-53 (Al): The Al-based gel is put into 10 ml DMF solution containing 0.096 g $NH_2$—BDC and keep still at room temperature for 12 hours and then 110° C. for 48 hours, the wet gel is then washed with DMF, methanol, and ethanol or acetone, for 3 times, respectively, with solvents exchanged 3 times per day, and dried supercritically to produce a $NH_2$-MIL-101 (Al) aerogel.

Example 29—MOF-74 (Ni) Aerogel

The Ni-based gel was put into 7 ml DEF:Ethanol:$H_2O$ (3:2:2) solution containing 0.08 g 1,4-dioxido-2,5-benzenedicarboxylate (DOBDC) solution and keep still at room temperature for 12 hours and then 90° C. for 48 hours, the wet gel is then washed with DMF, methanol, and ethanol or acetone, for 3 times, respectively, with solvents exchanged 3 times per day, and dried supercritically to produce a MOF-74(Ni) aerogel.

Example 30—MIL-53 (Fe) Aerogel

The Fe-based gel is put into 10 ml DMF solution containing 0.12 g terephthalic acid (BDC) and keep still at room temperature for 12 hours and then 100° C. for 48 hours, the wet gel is then washed with DMF, methanol, and ethanol or acetone, for 3 times, respectively, with solvents exchanged 3 times per day, and dried supercritically to produce a MIL-53 (Fe) aerogel.

Example 31—$NH_2$-MIL-53 (Fe) Aerogel

The Fe-based gel is put into 10 ml DMF solution containing 0.096 g $NH_2$—BDC and keep still at room temperature for 12 hours and then 100° C. for 48 hours, the wet gel is then washed with DMF, methanol, and ethanol or acetone, for 3 times, respectively, with solvents exchanged 3 times per day, and dried supercritically to produce a $NH_2$-MIL-53 (Fe) aerogel.

Example 32—MIL-100 (Fe) Aerogel

The Fe-based gel is put into 6 ml DEF:$H_2O$ (5:1) solution containing 0.09 g 1,3,5-benzenetricarboxylate (BTC) and keep still at room temperature for 12 hours and then 100° C. for 48 hours, the wet gel is then washed with DMF, methanol, and ethanol or acetone, for 3 times, respectively, with solvents exchanged 3 times per day, and dried supercritically to produce a Fe-MIL-100 aerogel.

Example 33—MIL-101 (Fe) Aerogel

The Fe-based gel is put into 10 ml DMF solution containing 0.12 g terephthalic acid (BDC) and 0.1 ml acetic acid, and the system keep still at room temperature for 12 hours and then 90° C. for 48 hours, the wet gel is then washed with DMF, methanol, and ethanol or acetone, for 3 times, respectively, with solvents exchanged 3 times per day, and dried supercritically to produce a Fe-MIL-101 aerogel.

Example 34—$NH_2$-MIL-101 (Fe) Aerogel

The Fe-based gel is put into 10 ml DMF solution containing 0.1 g $NH_2$—BDC, and the system keep still at room temperature for 12 hours and then 100° C. for 48 hours, the wet gel is then washed with DMF, methanol, and ethanol or acetone, for 3 times, respectively, with solvents exchanged 3 times per day, and dried supercritically to produce a Fe-BTC aerogel.

Example 35—HKUST-1(Cu) Aerogel

The Cu-based gel is put into 10 ml ethanol/water (1:1) solution containing 0.08 g 1,3,5-benzenetricarboxylate (BTC) and 0.2 ml DEA, and the system keep still at room temperature for 36 hours, the converted wet gel is then washed with DMF, methanol, and ethanol or acetone, for 3 times, respectively, with solvents exchanged 3 times per day, and dried supercritically to produce a HKUST-1aerogel.

Example 36—Cu-BDC Aerogel

The Cu-based gel is put into 10 ml DMF solution containing 0.12 g terephthalic acid (BDC), and the system keep still at room temperature for 36 hours, the converted wet gel is then washed with DMF, methanol, and ethanol or acetone, for 3 times, respectively, with solvents exchanged 3 times per day, and dried supercritically to produce a Cu-BDC aerogel.

Example 37—MIL-53(Cr) Aerogel

The Cr-based gel is put into 10 ml DEF/$H_2O$ (9:1) solution containing 0.16 g terephthalic acid (BDC) and keep still at room temperature for 36 hours and then 120° C. for 48 hours, the converted wet gel is then washed with DMF, methanol, and ethanol or acetone, for 3 times, respectively, with solvents exchanged 3 times per day, and dried supercritically to produce a MIL-53 (Cr) aerogel.

Example 38—$NH_2$-MIL-53(Cr) Aerogel

The Cr-based gel is put into 10 ml DEF solution containing 0.12 g $NH_2$—BDC and keep still at room temperature for 36 hours and then 120° C. for 48 hours, the converted wet gel is then washed with DMF, methanol, and ethanol or acetone, for 3 times, respectively, with solvents exchanged 3 times per day, and dried supercritically to produce a $NH_2$-MIL-53 (Cr) aerogel.

Example 39—MIL-101(Cr) Aerogel

The Cr-based gel is put into 10 ml DMF solution containing 0.096 g terephthalic acid (BDC) and keep still at room temperature for 36 hours and then 120° C. for 48 hours, the converted wet gel is then washed with DMF, methanol, and ethanol or acetone, for 3 times, respectively, with solvents exchanged 3 times per day, and dried supercritically to produce a MIL-101 (Cr) aerogel.

Example 40—NH$_2$-MIL-101(Cr) Aerogel

The Cr-based gel is put into 10 ml DMF solution containing 0.12 g NH$_2$—BDC and keep still at room temperature for 36 hours and then 120° C. for 48 hours, the converted wet gel is then washed with DMF, methanol, and ethanol or acetone, for 3 times, respectively, with solvents exchanged 3 times per day, and dried supercritically to produce a NH$_2$-MIL-101 (Cr) aerogel.

Example 41—UiO-66 (Zr) Aerogel

The Zr-based gel is put into 10 ml DMF solution containing 0.16 g terephthalic acid (BDC) and keep still at room temperature for 36 hours and then 120° C. for 48 hours, the converted wet gel is then washed with DMF, methanol, and ethanol or acetone, for 3 times, respectively, with solvents exchanged 3 times per day, and dried supercritically to produce a UiO-66 (Zr) aerogel.

Example 42—NH$_2$-UiO-66 (Zr) Aerogel

The Zr-based gel is put into 10 ml DEF:H$_2$O (9:1) solution containing 0.12 g NH$_2$—BDC and keep still at room temperature for 36 hours and then 120° C. for 48 hours, the converted wet gel is then washed and dried supercritically to produce a NH$_2$-UiO-66 (Zr) aerogel Example 43—Ce-BDC Aerogel The Ce-based gel is put into 10 ml DMF solution containing 0.12 g terephthalic acid (BDC) and keep still at room temperature for 36 hours and then 100° C. for 48 hours, the converted wet gel is then washed with DMF, methanol, and ethanol or acetone, for 3 times, respectively, with solvents exchanged 3 times per day, and dried supercritically to produce a Ce-BDC aerogel.

Example 44—ZIF-9 (Co) Aerogel

The Co-based gel is put into 10 ml DMF solution containing 0.12 g H-PhIM and keep still at room temperature for 36 hours and then 100° C. for 48 hours, the converted wet gel is then washed with DMF, methanol, and ethanol or acetone, for 3 times, respectively, with solvents exchanged 3 times per day, and dried supercritically to produce a ZIF-9 (Co) aerogel.

Example 45—ZIF-67 (Co) Aerogel

The Co-based gel is put into 10 ml DMF solution containing 0.18 g HmIm and keep still at room temperature for 12 hours and then 80° C. for 48 hours, the converted wet gel is then washed with DMF, methanol, and ethanol or acetone, for 3 times, respectively, with solvents exchanged 3 times per day, and dried supercritically to produce a ZIF-67 (Co) aerogel.

CLOSING STATEMENT

It will be understood that many additional changes in the details, materials, steps and arrangement of parts, which have been herein described and illustrated to explain the nature of the subject matter, may be made by those skilled in the art within the principle and scope of the invention as expressed in the appended claims. It is conceivable that practitioners in the art can modify the reaction media, reactant rations, pH, temperature and time to produce other MOF or MOF-related aerogel materials according to the general procedure embodied in this disclosure.

What is claimed is:

1. A method of forming an aerogel, comprising:
preparing metal-organic framework (MOF) aerogels by:
preparing a porous solid comprising a metal precursor for the MOF aerogels, and
transforming the metal precursor into the metal-organic framework (MOF) by reacting the porous solid with organic ligands mixed with a solvent,
followed by:
removing the solvent by supercritical extraction and drying,
wherein the aerogel has a solid contents in a range from 0.15 to 0.25 g/cm$^3$, with a metal-organic framework (MOF) conversion of 75% to 99%.

2. The method as described in claim 1, further comprising:
the porous solid comprising the metal precursor comprising a sol-gel containing the metal precursor, and
the transforming the metal precursor in a gel network into the metal-organic framework (MOF) comprising reacting the sol-gel with the organic ligands mixed with a solvent.

3. The method as described in claim 2, further comprising:
assembling the metal precursor into the gel network via a sol-gel process comprising use of gelation agents.

4. The method as described in claim 3, further comprising:
using a polymer to strengthen the gel network during a gelation process performed as part of the sol-gel process.

5. The method as described in claim 4, wherein the polymer comprises polyacrylic acid used as a scaffold to strengthen the gel network during the gelation process.

6. The method as described in claim 4, further comprising:
using a metal precursor gel to strengthen the gel network.

7. The method as described in claim 3, further comprising:
using a metal precursor gel to strengthen the gel network.

8. The method as described in claim 3, further comprising:
using a plurality of precursors, thereby forming the gel network from a corresponding plurality of metals; and
using a metal precursor gel or a polymer to strengthen the gel network.

9. The method as described in claim 1, further comprising:
using the metal precursor in a gel network,
introducing the organic ligands into a wet gel and allowing the organic ligands to react with the metal precursor to produce a gel network; and
transforming the gel network into the metal-organic frameworks (MOFs).

10. The method as described in claim 1, further comprising:
using the metal precursor in a gel network, and
transforming the gel network into a metal organic framework (MOF) wet gel.

11. The method as described in claim 1, further comprising:
using the metal precursor in a gel network, and
using lyophilisation to control the transformation of the gel network into a metal organic framework (MOF) aerogel from a MOF wet gel.

12. The method as described in claim 1, further comprising:
    using the metal precursor in a gel network, and
    using lyophilisation and supercritical drying to control the transformation of the gel network into a metal organic framework (MOF) gel from a MOF wet gel.

13. The method as described in claim 1, further comprising:
    using the metal precursor in a gel network, and
    using supercritical drying to control the transformation of the gel network into metal organic framework (MOF) from a MOF wet gel.

14. The method as described in claim 1, wherein the aerogel has a solid contents in a range from 0.03 to 0.5 g/cm$^3$, with a metal-organic framework (MOF) conversion of 75% to 99%.

15. A method of forming an aerogel, comprising:
    preparing metal-organic framework (MOF) aerogels by:
        a step of preparing a porous solid containing a metal precursor, and
        a step of transforming the metal precursor into the metal-organic framework (MOF) by reacting the porous solid containing the metal precursor with organic ligands mixed with a solvent,
    followed by:
        removing the solvent by supercritical extraction and drying,
    wherein the aerogel has a solid contents in a range from 0.15 to 0.25 g/cm$^3$, with a metal-organic framework (MOF) conversion of 75% to 99%.

16. The method as described in claim 15, further comprising:
    the step of preparing the porous solid containing the metal precursor comprising:
    preparing the porous solid containing the metal precursor comprising preparing the metal precursor to comprise a sol-gel containing the metal precursor, and
    the step of transforming the metal precursor in a gel network into the metal-organic framework (MOF) comprising reacting the sol-gel with the organic ligands mixed with a solvent.

17. The method as described in claim 16, further comprising:
    a step of assembling the metal precursor into the gel network via a sol-gel process comprising use of gelation agents.

18. The method as described in claim 17, further comprising:
    a step of using a polymer to strengthen the gel network during a gelation process performed as part of the sol-gel process.

* * * * *